United States Patent
Yamamoto et al.

(10) Patent No.: US 8,543,271 B2
(45) Date of Patent: Sep. 24, 2013

(54) POWER SUPPLY SYSTEM FOR ELECTRICALLY POWERED VEHICLE, AND METHOD FOR CONTROLLING THE SAME

(75) Inventors: Masaya Yamamoto, Kasugai (JP); Norihiko Kato, Handa (JP); Haruki Sato, Toyota (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 472 days.

(21) Appl. No.: 12/996,750

(22) PCT Filed: Oct. 31, 2008

(86) PCT No.: PCT/JP2008/069869
§ 371 (c)(1),
(2), (4) Date: Dec. 7, 2010

(87) PCT Pub. No.: WO2010/050044
PCT Pub. Date: May 6, 2010

(65) Prior Publication Data
US 2011/0087395 A1    Apr. 14, 2011

(51) Int. Cl.
*B60L 11/18*    (2006.01)
(52) U.S. Cl.
USPC ............................. 701/22; 180/65.265
(58) Field of Classification Search
USPC .................. 701/22, 54, 112; 180/5.1, 65.21, 180/65.265, 65.245, 65.25, 65.28, 65.29, 180/65.285, 65.31; 903/930; 307/10.1
See application file for complete search history.

(56) References Cited

U.S. PATENT DOCUMENTS
8,004,104 B2 * 8/2011 Hench ............................ 290/53

FOREIGN PATENT DOCUMENTS

| JP | 11-027998 A | 1/1999 |
|---|---|---|
| JP | 2003-209969 A | 7/2003 |
| JP | 2004-359032 A | 12/2004 |
| JP | 2008-109840 A | 5/2008 |
| JP | 2008-167620 A | 7/2008 |
| JP | 2008-220084 A | 9/2008 |

* cited by examiner

*Primary Examiner* — Marthe Marc-Coleman
(74) *Attorney, Agent, or Firm* — Sughrue Mion, PLLC

(57) ABSTRACT

A power supply system includes a main power storage device and a plurality of sub power storage devices. A converter is connected to selected one of the sub power storage devices to convert voltage between the selected sub power storage device and an electric power feeding line bidirectionally. When a request for switching the selected sub power storage device in use is generated, upper limits on electric power input/output to/from the selected sub power storage device are continuously varied. Thus, discontinuous variation of electric power input/output to/from the power supply system during the process for switching the selected sub power storage device can be avoided. Consequently, sudden change in a behavior of an electrically powered vehicle can be avoided.

12 Claims, 11 Drawing Sheets

POWER SUPPLY SYSTEM FOR ELECTRICALLY POWERED VEHICLE, AND METHOD FOR CONTROLLING THE SAME

TECHNICAL FIELD

The present invention relates to a power supply system for an electrically powered vehicle and a method for controlling the same, and more particularly to control of a power supply system of an electrically powered vehicle having a main power storage device and a plurality of sub power storage devices mounted thereon.

BACKGROUND ART

In recent years, as an environmentally friendly vehicle, electrically powered vehicles such as electric cars, hybrid cars and fuel cell cars have been developed into practical use. These electrically powered vehicles have mounted thereon an electric motor generating force to drive the vehicle and a power supply system for supplying electric power to drive the motor, that is configured to include a power storage device.

In particular for hybrid cars, there has been proposed a configuration charging a vehicle-mounted power storage device by a power supply external to the vehicle (hereinafter also referred to as an "external power supply"), and accordingly, these electrically powered vehicles require increased distances travelable on electric power stored in the vehicle-mounted power storage device. Hereinafter, charging a vehicle-mounted power storage device by an external power supply will also simply be referred to as "external charging".

For example, Japanese Patent Laying-Open No. 2008-109840 (Patent Document 1) and Japanese Patent Laying-Open No. 2003-209969 (Patent Document 2) describe a power supply system having a plurality of power storage devices (batteries) connected in parallel. The power supply system described in Patent Documents 1 and 2 is provided with a voltage converter (a converter) for each power storage device (battery) as a charging/discharging adjustment mechanism. In contrast, Japanese Patent Laying-Open No. 2008-167620 (Patent Document 3) describes a configuration of a power supply device in a vehicle having a main power storage device and a plurality of sub power storage devices mounted thereon, that provides a converter associated with a main power supply device and a converter shared by the plurality of sub power storage devices. This configuration can achieve a reduced number of elements in the device and also an increased storable amount of energy.

Patent Document 1: Japanese Patent Laying-Open No. 2008-109840
Patent Document 2: Japanese Patent Laying-Open No. 2003-209969
Patent Document 3: Japanese Patent Laying-Open No. 2008-167620

DISCLOSURE OF THE INVENTION

Problems to be Solved by the Invention

In the power supply device described in Patent Document 3 has one of the plurality of sub power storage devices selectively connected to the converter to allow the main power supply device and the selected sub power storage device to supply electric power to drive an electric motor for driving a vehicle. In such a power supply device, when the sub power storage device in use has a decreased SOC, a different sub power storage device is connected to the converter to use the plurality of sub power storage devices sequentially to allow stored electric energy to be used to achieve increased electric vehicle (EV) travelable distance. By changing the sub power storage device connected to the converter, however, values of such parameters as a voltage and a temperature of the sub power storage device may discontinuously be varied. In general, such parameters are used for controlling charging and discharging to and from the power storage device during traveling of the electrically powered vehicle. Therefore, discontinuous variation of the value of the parameter associated with the power storage device may affect traveling of the electrically powered vehicle.

The present invention has been made to overcome such disadvantage and an object of the present invention is to appropriately perform a connection switching process for changing a sub power storage device to be used, in a power supply system configured to include a main power storage device and a plurality of sub power storage devices sharing a voltage converter (a converter).

Means for Solving the Problems

According to one aspect of the present invention, a power supply system for an electrically powered vehicle incorporating a motor for generating power to drive the vehicle includes a main power storage device, an electric power feeding line, a first voltage converter, a plurality of sub power storage devices provided in parallel to each other, a second voltage converter, a connection unit, and a switching control device. The electric power feeding line is configured to feed electric power to an inverter for driving and controlling the motor. The first voltage converter is provided between the electric power feeding line and the main power storage device, and configured to convert voltage therebetween bidirectionally. The second voltage converter is provided between the plurality of sub power storage devices and the electric power feeding line, and configured to convert voltage between one of the plurality of sub power storage devices and the electric power feeding line bidirectionally. The connection unit is provided between the plurality of sub power storage devices and the second voltage converter, and configured to selectively connect a sub power storage device selected from the plurality of sub power storage devices to the second voltage converter. The switching control device controls selective connection between the plurality of sub power storage devices and the second voltage converter. The switching control device includes a switching determination unit, a first electric power limiter unit, a switching control unit, and a second electric power limiter unit. The switching determination unit is configured to determine whether the selected sub power storage device should be switched or not based on a state of charge of each of the plurality of sub power storage devices. The first electric power limiter unit is configured to continuously decrease upper limit values on electric power input and output to and from the selected sub power storage device to 0 when the switching determination unit determines that the selected sub power storage device should be switched. The switching control unit is configured to switch connection between the plurality of sub power storage devices and the second voltage converter when the upper limit values on electric power input and output have reached 0. The second electric power limiter unit is configured to continuously increase the upper limit values on electric power input and output to values corresponding to a state of charge of a sub power storage device newly connected to the second voltage converter after the switching control unit switched connection between the plurality of sub power storage devices and the second voltage converter.

Preferably, the switching control device further includes a data correction unit. The data correction unit is configured to perform a correction process for correcting a value of a parameter associated with the selected sub power storage device during a period in which connection between the plurality of sub power storage devices and the second voltage converter is switched. The data correction unit continuously varies the value of the parameter from a first value associated with a sub power storage device disconnected from the second voltage converter to a second value associated with the newly connected sub power storage device while the correction process is performed.

Preferably, the electrically powered vehicle includes a traveling control unit. The traveling control unit is configured to control the second voltage converter by using a value of an input voltage for the second voltage converter while the electrically powered vehicle is traveling. The parameter includes a voltage of the selected sub power storage device. The power supply system further includes a capacitor for smoothing the input voltage for the second voltage converter and a voltage detection unit for detecting the input voltage. The switching control device further includes a discharge control unit. The discharge control unit is configured to cause the capacitor to discharge prior to switching of the selected sub power storage device. The data correction unit provides to the traveling control unit, a voltage value of the selected sub power storage device calculated in the correction process as a value of the input voltage, instead of a value detected by the voltage detection unit, after the discharge control unit caused the capacitor to discharge.

Preferably, the switching control device further includes an upper limit value fixing unit. The upper limit value fixing unit is configured to maintain the upper limit values on electric power input and output at 0 during a period in which connection between the plurality of sub power storage devices and the second voltage converter is switched.

Preferably, the switching control device further includes a third electric power limiter unit. The third electric power limiter unit is configured to temporarily relax charging and discharging restriction on the main power storage device during a period from start of decrease in the upper limit values on electric power input and output by the first electric power limiter unit until completion of switching of connection between the plurality of sub power storage devices and the second voltage converter by the connection unit.

Preferably, the electrically powered vehicle further includes an internal combustion engine and a traveling control unit. The internal combustion engine is configured to be able to output power to drive the vehicle independently of the motor. The traveling control unit is configured to start the internal combustion engine when total required power of the electrically powered vehicle is greater than a sum of an upper limit value on electric power output from the main power storage device and an upper limit value on electric power output from the selected sub power storage device.

According to another aspect of the present invention, a method for controlling a power supply system of an electrically powered vehicle incorporating a motor for generating power to drive the vehicle is provided. The power supply system includes a main power storage device, an electric power feeding line, a first voltage converter, a plurality of sub power storage devices provided in parallel to each other, a second voltage converter, a connection unit, and a switching control device. The electric power feeding line is configured to feed electric power to an inverter for driving and controlling the motor. The first voltage converter is provided between the electric power feeding line and the main power storage device, and configured to convert voltage therebetween bidirectionally. The second voltage converter is provided between the plurality of sub power storage devices and the electric power feeding line, and configured to convert voltage between one of the plurality of sub power storage devices and the electric power feeding line bidirectionally. The connection unit is provided between the plurality of sub power storage devices and the second voltage converter, and configured to selectively connect a sub power storage device selected from the plurality of sub power storage devices to the second voltage converter. The switching control device controls selective connection between the plurality of sub power storage devices and the second voltage converter. The method includes the steps of determining whether the selected sub power storage device should be switched or not based on a state of charge of each of the plurality of sub power storage devices, continuously decreasing upper limit values on electric power input and output to and from the selected sub power storage device to 0 when it is determined in the determining step that the selected sub power storage device should be switched, switching connection between the plurality of sub power storage devices and the second voltage converter when the upper limit values on electric power input and output have reached 0 in the decreasing step, and continuously increasing the upper limit values on electric power input and output to values corresponding to a state of charge of a sub power storage device newly connected to the second voltage converter after connection between the plurality of sub power storage devices and the second voltage converter is switched in the switching step.

Preferably, the method further includes the step of performing a correction process for correcting a value of a parameter associated with the selected sub power storage device during a period in which connection between the plurality of sub power storage devices and the second voltage converter is switched. As a result of the correction process, the value of the parameter is continuously varied from a first value associated with a sub power storage device disconnected from the second voltage converter to a second value associated with the newly connected sub power storage device.

Preferably, the electrically powered vehicle includes a traveling control unit. The traveling control unit is configured to control the second voltage converter by using a value of an input voltage for the second voltage converter while the electrically powered vehicle is traveling. The parameter includes a voltage of the selected sub power storage device. The power supply system further includes a capacitor for smoothing the input voltage for the second voltage converter and a voltage detection unit for detecting the input voltage. The method further includes the step of causing the capacitor to discharge prior to switching of the selected sub power storage device. In the step of performing a correction process, the traveling control unit is provided with a voltage value of the selected sub power storage device calculated in the correction process as a value of the input voltage, instead of a value detected by the voltage detection unit after the capacitor discharged in the step of causing the capacitor to discharge.

Preferably, the method further includes the step of maintaining the upper limit values on electric power input and output at 0 during a period in which connection between the plurality of sub power storage devices and the second voltage converter is switched.

Preferably, the method further includes the step of temporarily relaxing charging and discharging restriction on the main power storage device during a period from start of decrease in the upper limit values on electric power input and output in the decreasing step until completion of switching of connection between the plurality of sub power storage devices and the second voltage converter by the connection unit.

Preferably, the electrically powered vehicle further includes an internal combustion engine configured to be able to output power to drive the vehicle independently of the motor. The internal combustion engine is started when total required power of the electrically powered vehicle is greater than a sum of an upper limit value on electric power output from the main power storage device and an upper limit value on electric power output from the selected sub power storage device.

Effects of the Invention

According to the present invention, in the power supply system configured to include a main power storage device and a plurality of sub power storage devices, with the plurality of power storage devices sharing a voltage converter (a converter), the connection switching process for changing a sub power storage device to be used can appropriately be performed.

Figure 1:
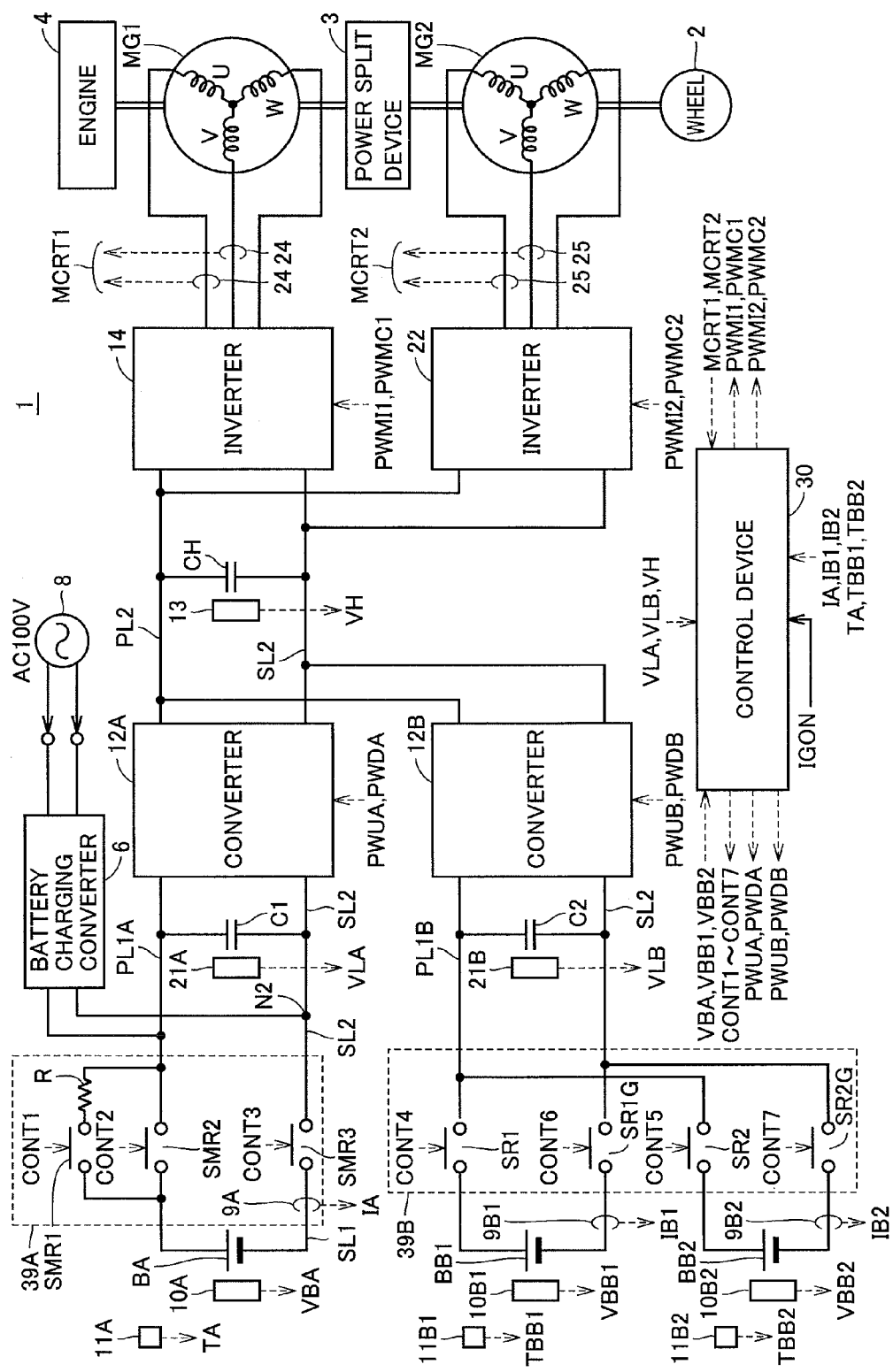
FIG. 1 is a diagram showing a main configuration of an electrically powered vehicle incorporating a power supply system according to an embodiment of the present invention.

DESCRIPTION OF THE REFERENCE SIGNS 1 electrically powered vehicle; 2 wheel; 3 power split device; 4 engine; 6 battery charging converter (external charging); 8 external power supply; 9A, 9B1, 9B2 current sensor; 10A, 10B1, 10B2, 13, 21A, 21B voltage sensor; 11A, 11B1, 11B2 temperature sensor; 12A converter (dedicated to main power storage device); 12B converter (shared by sub power storage devices); 14, 22 inverter; 15 to 17 each phase arm (U, V, W); 24, current sensor; 30 control device; 39A connection unit (for main power storage device); 39B connection unit (for sub power storage device); 100 switching determination unit; 110 step-up-voltage instruction unit; 120 electric power limiter unit (for main power storage device); 130 electric power limiter unit (for sub power storage device); 140 connection switching control unit; 150 data correction unit; 200 converter control unit; 250 traveling control unit; 260 total power calculation unit; 270, 280 inverter control unit; BA battery (main power storage device); BB selected sub power storage device; BB1, BB2 battery (sub power storage device); C1, C2, CH smoothing capacitor; CMBT step-up voltage command signal; CONT1 to CONT7 relay control signal; D1 to D8 diode; FBT flag (stepping up voltage completed); IA, IB1, IB2 input/output current (battery); ID variable (status of switching process); IGON start signal; L1 reactor; MCRT1, MCRT2 motor current value; MG1, MG2 motor-generator; N2 node; PL1A, PL1B power supply line; PL2 electric power feeding line; Pttl total required power; PWMI, PWMI1, PWMI2, PWMC, PWMC1, PWMC2 control signal (for inverter); PWU, PWUA, PWDA, PWD, PWDA, PWDB control signal (for converter); Q1 to Q8 IGBT device; R limiting resistor; SL1, SL2 ground line; SMR1 to SMR3 system main relay; SR1, SR1G, SR2, SR2G relay; TA, TBB1, TBB2 battery temperature (battery); Tqcom1, Tqcom2 torque command value; UL, VL, WL line (3 phase); V1 predetermined voltage; VBA, VBB1, VBB2 voltage (battery output voltage); VLA, VLB, VH voltage; VHref voltage command value (VH); Win upper limit on electric power input; Win(M) upper limit on electric power input (to main power storage device); Win(S) upper limit on electric power input (to selected sub power storage device); Wout upper limit on electric power output; Wout(M) upper limit on electric power output (from main power storage device); Wout(S) upper limit on electric power output (from selected sub power storage device); and a weight coefficient.

BEST MODES FOR CARRYING OUT THE INVENTION

Hereinafter reference will be made to the drawings to more specifically describe the present invention in embodiments. In the following description, identical or equivalent components are denoted by identical reference characters and will in principle not be described repeatedly.

FIG. 1 shows a main configuration of an electrically powered vehicle incorporating a power supply system according to an embodiment of the present invention.

With reference to FIG. 1, an electrically powered vehicle 1 includes power storage devices implemented as batteries BA, BB1, BB2, connection units 39A, 39B, converters 12A, 12B, smoothing capacitors C1, C2, CH, voltage sensors 10A, 10B1, 10B2, 13, 21A, 21B, temperature sensors 11A, 11B1, 11B2, current sensors 9A, 9B1, 9B2, an electric power feeding line PL2, inverters 14, 22, motor-generators MG1, MG2, a wheel 2, a power split device 3, an engine 4, and a control device 30.

The present embodiment provides a power supply system of the electrically powered vehicle including a main power storage device implemented as battery BA, electric power feeding line PL2 supplying electric power to inverter 14 driving motor-generator MG2, converter 12A provided between main power storage device (BA) and electric power feeding line PL2 to serve as a voltage converter converting voltage bidirectionally, batteries BB1, BB2 implementing a plurality of sub power storage devices provided in a manner parallel to each other, and converter 12B provided between the plurality of sub power storage devices (BB1, BB2) and electric power feeding line PL2 to serve as a voltage converter converting voltage bidirectionally. Voltage converter (12B) is connected selectively to one of the plurality of sub power storage devices (BB1, BB2) to convert voltage between the connected sub power storage device and electric power feeding line PL2 bidirectionally.

A sub power storage device (one of BB1 and BB2) and the main power storage device (BA) have their storable capacity set so that, for example, when they are concurrently used, they can output maximum power tolerated for an electric load (22 and MG2) connected to the electric power feeding line. This allows the vehicle without using the engine, i.e., traveling as an EV (Electric Vehicle), to travel with maximum power. If the sub power storage device's power storage state becomes poor, the sub power storage device can be exchanged to cause the vehicle to further travel, and if the sub power storage device's electric power has completely been consumed, then, in addition to the main power storage device, the engine can be used to allow the vehicle to travel with maximum power without using the sub power storage device.

Furthermore, such a configuration allows converter 12B to be shared between the plurality of sub power storage devices. This can eliminate the necessity of increasing the number of converters to be equal to that of power storage devices. For further increased EV travelable distance, an additional battery can be introduced in parallel with batteries BB1, BB2.

Preferably, this electrically powered vehicle has mounted thereon a main power storage device and sub power storage devices that are externally chargeable. For this purpose, electrically powered vehicle 1 further includes a battery charging device (a charging converter) 6 for connection to an external power supply 8 which is for example a commercial power supply of AC 100V. Battery charging device (6) converts alternate current to direct current and also adjusts voltage to supply electric power charged to a battery. Note that external charging may be achieved by the above-described configuration and in addition a system connecting a neutral point of a stator coil of motor-generator MG1, MG2 to alternate current power supply or a system causing converters 12A, 12B to together function as an AC/DC conversion device.

Smoothing capacitor C1 is connected between a power supply line PL1A and a ground line SL2. Voltage sensor 21A detects a voltage VLA across ends of smoothing capacitor C1 and outputs it to control device 30. Converter 12A can step up voltage across terminals of smoothing capacitor C1 and supply it to electric power feeding line PL2.

Smoothing capacitor C2 is connected between a power supply line PL1B and ground line SL2. Voltage sensor 21B detects a voltage VLB across ends of smoothing capacitor C2 and outputs it to control device 30. Converter 12B can step up voltage across terminals of smoothing capacitor C2 and supply it to electric power feeding line PL2.

Smoothing capacitor CH smoothes the voltage stepped up by converter 12A, 12B. Voltage sensor 13 senses a voltage VH across terminals of smoothing capacitor CH and outputs it to control device 30.

Alternatively, in an opposite direction, converters 12A, 12B can step down voltage VH across terminals smoothed by smoothing capacitor CH and supply it to power supply lines PL1A, PL1B.

Inverter 14 receives direct current voltage from converter 12B and/or 12A, converts it to 3 phase alternate current voltage, and outputs it to motor-generator MG1. Inverter 22 receives direct current voltage from converter 12B and/or 12A, converts it to 3 phase alternate current voltage, and outputs it to motor-generator MG2.

Power split device 3 is a mechanism coupled to engine 4 and motor-generators MG1, MG2 to distribute motive power therebetween. The power split device can for example be a planetary gear mechanism having three shafts of rotation of a sun gear, a planetary carrier, and a ring gear. In the planetary gear mechanism, when two of the three shafts of rotation have their rotation determined, that of the other one shaft of rotation is compulsively determined. These three shafts of rotation are connected to engine 4 and motor-generators MG1, MG2 at their respective shafts of rotation, respectively. Motor-generator MG2 has its shaft of rotation coupled to wheel 2 by a reduction gear, a differential gear or the like (not shown). Furthermore, power split device 3 may further have a speed reducer incorporated therein for the shaft of rotation of motor-generator MG2.

Connection unit 39A includes a system main relay SMR2 connected between the positive electrode of battery BA and power supply line PL1A, a system main relay SMR1 and a limiting resistor R connected in series and connected in parallel with system main relay SMR2, and a system main relay SMR3 connected between the negative electrode of battery BA (a ground line SL1) and a node N2.

System main relays SMR1 to SMR3 have their conduction/non-conduction states controlled (or are turned on/off) by relay control signals CONT1 to CONT3, respectively, issued from control device 30.

Voltage sensor 10A measures a voltage VA across terminals of battery BA. Furthermore, temperature sensor 11A measures a temperature TA of battery BA, and current sensor 9A measures a current IA input/output to/from battery BA. These sensors' measurements are output to control device 30. Based on these measurements, control device 30 monitors a state of battery BA represented by state of charge (SOC).

Connection unit 39B is provided between power supply line PL1B and ground line SL2, and batteries BB1, BB2. Connection unit 39B includes a relay SR1 connected between the positive electrode of battery BB1 and power supply line PL1B, a relay SR1G connected between the negative electrode of battery BB1 and ground line SL2, a relay SR2 connected between the positive electrode of battery BB2 and power supply line PL1B, and a relay SR2G connected between the negative electrode of battery BB2 and ground line SL2.

Relays SR1, SR2 have their conduction/non-conduction states controlled (or are turned on/off) by relay control signals CONT4, CONT5, respectively, issued from control device 30. Relays SR1G, SR2G have their conduction/non-conduction states controlled (or are turned on/off) by relay control signals CONT6, CONT7, respectively, issued from control device 30. Ground line SL2 extends through converters 12A, 12B toward inverters 14 and 22, as will be described later.

Voltage sensors 10B1 and 10B2 measure voltages VBB1 and VBB2 across terminals of batteries BB1 and BB2, respectively. Temperature sensors 11B1 and 11B2 measure temperatures TBB1 and TBB2 of batteries BB1 and BB2, respectively. Current sensors 9B1 and 9B2 measure currents IB1 and IB2 input/output to/from batteries BB1 and BB2, respectively. These sensors' measurements are output to control device 30. Based on these measurements, control device 30 monitors the states of batteries BB1, BB2 represented by SOC.

Battery BA, BB1, BB2 can for example be a lead-acid battery, a nickel metal hydride battery, a lithium ion battery, or a similar secondary battery, an electric double layer capacitor or a similar capacitor of large capacity, or the like. Inverter 14 is connected to electric power feeding line PL2 and ground line SL2.

Inverter 14 receives a voltage stepped up from converter 12A and/or converter 12B, and drives motor-generator MG1 for example to start engine 4. Furthermore, inverter 14 returns to converters 12A and 12B the electric power generated by motor-generator MG1 by motive power transmitted from engine 4. At this time, converters 12A and 12B are controlled by control device 30 to operate as step-down converters.

Current sensor 24 detects a current that flows to motor-generator MG1 as a motor current value MCRT1, and outputs motor current value MCRT1 to control device 30.

Inverter 22 is connected to electric power feeding line PL2 and ground line SL2 in a manner parallel with inverter 14. Inverter 22 receives direct current voltage from converters 12A and 12B, converts it to 3 phase alternate current voltage, and outputs it to motor-generator MG2 driving wheel 2. Furthermore, inverter 22 returns to converters 12A and 12B the electric power generated by motor-generator MG2 as the vehicle is regeneratively braked. At this time, converters 12A and 12B are controlled by control device 30 to operate as step-down converters.

Current sensor 25 detects a current that flows to motor-generator MG2 as a motor current value MCRT2, and outputs motor current value MCRT2 to control device 30.

Control device 30 is constituted of an electronic control unit (ECU) having a central processing unit (CPU) and a memory (not shown) incorporated therein, and in accordance with a map and a program stored in the memory, uses each sensor's measurement to perform operation processing. Note that control device 30 may have a portion configured to allow an electronic circuit or similar hardware to perform predetermined arithmetic and logical operations.

More specifically, control device 30 receives torque command values for motor-generators MG1, MG2, respectively, the motor-generators' respective speeds, the voltage VBA, VBB1, VBB2, VLA, VLB, VH values, motor current values MCRT1, MCRT2, and a start signal IGON. Then, control device 30 outputs a control signal PWUB instructing converter 12B to step up voltage, a control signal PWDB indicating voltage step-down, and a shutdown signal prohibiting an operation.

Furthermore, control device 30 outputs a control signal PWMI1 instructing inverter 14 to convert direct current voltage output from converters 12A, 12B to alternate current voltage for driving motor-generator MG1, and a control signal PWMC1 instructing inverter 14 to convert alternate current voltage generated by motor-generator MG1 to direct current voltage and return it toward converters 12A, 12B for regeneration.

Similarly, control device 30 outputs a control signal PWMI2 instructing inverter 22 to convert direct current voltage to alternate current voltage for driving motor-generator MG2, and a control signal PWMC2 instructing inverter 22 to convert alternate current voltage generated by motor-generator MG2 to direct current voltage and return it toward converters 12A, 12B for regeneration.

Figure 2:
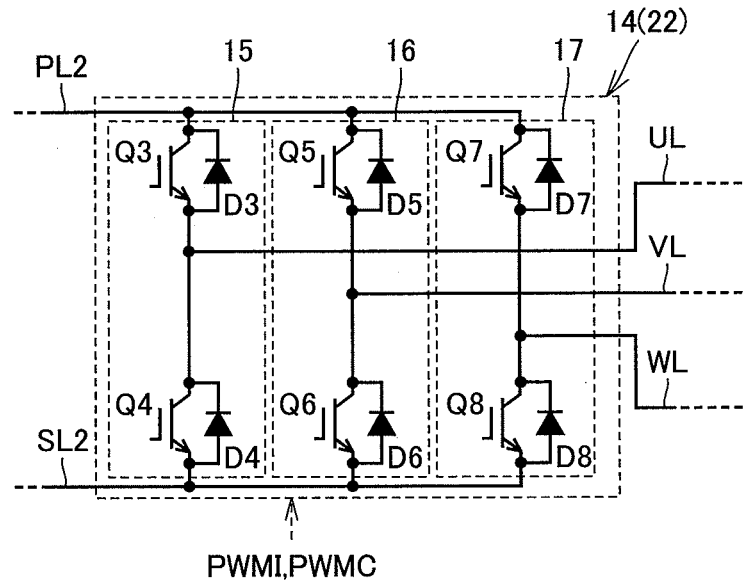
FIG. 2 is a circuit diagram showing in detail a configuration of each inverter shown in FIG. 1.

FIG. 2 is a circuit diagram showing in detail a configuration of inverters 14 and 22 shown in FIG. 1.

With reference to FIG. 2, inverter 14 includes a U-phase arm 15, a V-phase arm 16, and a W-phase arm 17. U-phase arm 15, V-phase arm 16, and W-phase arm 17 are connected between electric power feeding line PL2 and ground line SL2 in parallel.

U-phase arm 15 includes insulated gate bipolar transistor (IGBT) devices Q3, Q4 connected in series between electric power feeding line PL2 and ground line SL2, IGBT devices Q3, Q4, and their respective anti-parallel diodes D3, D4. Diode D3 has its cathode connected to IGBT device Q3 at the collector, and its anode to IGBT device Q3 at the emitter. Diode D4 has its cathode connected to IGBT device Q4 at the collector and its anode to IGBT device Q4 at the emitter.

V-phase arm 16 includes IGBT devices Q5, Q6 connected in series between electric power feeding line PL2 and ground line SL2, and their respective anti-parallel diodes D5, D6. IGBT devices Q5, Q6 and anti-parallel diodes D5, D6 are connected similarly as in U-phase arm 15.

W-phase arm 17 includes IGBT devices Q7, Q8 connected in series between electric power feeding line PL2 and ground line SL2, and their respective anti-parallel diodes D7, D8. IGBT devices Q7, Q8 and anti-parallel diodes D7, D8 are also connected similarly as in U-phase arm 15.

Note that in the present embodiment an IGBT device is indicated as a representative example of a power semiconductor switching element controllable to be turned on/off. In other words, it is also replaceable with a bipolar transistor, a field effect transistor, or a similar power semiconductor switching element.

Each phase arm has an intermediate point connected to motor-generator MG1 at each phase coil at each phase end. In other words, motor-generator MG1 is a 3 phase permanent magnet synchronous motor and the three U-, V-, W-phase coils each have one end connected together to an intermediate point. The U-phase coil has the other end connected to a line UL drawn from a connection node of IGBT devices Q3, Q4. The V-phase coil has the other end connected to a line VL drawn from a connection node of IGBT devices Q5, Q6. The W-phase coil has the other end connected to a line WL drawn from a connection node of IGBT devices Q7, Q8.

Inverter 22 shown in FIG. 1 is also different in that it is connected to motor-generator MG2, however, its internal circuit configuration is similar to inverter 14. Accordingly, it will not be described repeatedly in detail. Furthermore, FIG. 2 shows an inverter receiving control signals PWMI, PWMC. This is to avoid complexity. Specifically, as shown in FIG. 1, different control signals PWMI1, PWMC1 and control signals PWMI2, PWMC2 are input to inverters 14, 22, respectively.

Figure 3:
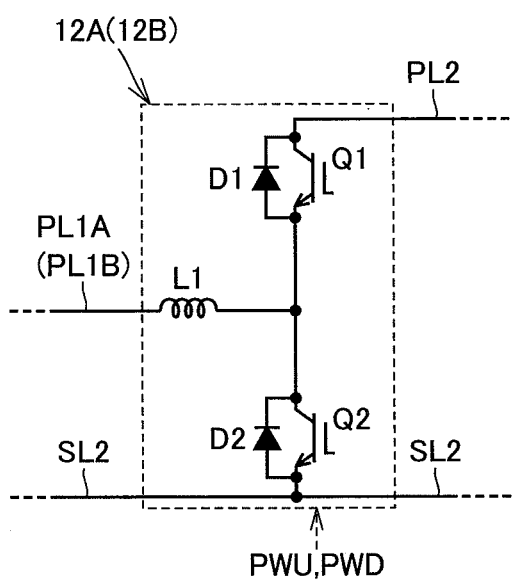
FIG. 3 is a circuit diagram showing in detail a configuration of each converter shown in FIG. 1.

FIG. 3 is a circuit diagram showing in detail a configuration of converters 12A and 12B shown in FIG. 1.

With reference to FIG. 3, converter 12A includes a reactor L1 having one end connected to power supply line PL1A, IGBT devices Q1, Q2 connected in series between electric power feeding line PL2 and ground line SL2, and their respective anti-parallel diodes D1, D2.

Reactor L1 has the other end connected to IGBT device Q1 at the emitter and to IGBT device Q2 at the collector. Diode D1 has its cathode connected to IGBT device Q1 at the collector and its anode to IGBT device Q1 at the emitter. Diode D2 has its cathode connected to IGBT device Q2 at the collector and its anode to IGBT device Q2 at the emitter.

Converter 12B shown in FIG. 1 is again different from converter 12A in that the former is not connected to power supply line PL1A and instead to power supply line PL1B, however, its internal circuit configuration is similar to converter 12A. Accordingly, it will not be described repeatedly in detail. Furthermore, FIG. 3 shows a converter receiving control signals PWU, PWD, however, this is to avoid complexity. As shown in FIG. 1, different control signals PWUA, PWDA and control signals PWUB, PWDB are input to inverters 14, 22, respectively.

In the power supply system of electrically powered vehicle 1, battery BA (the main power storage device) and a sub power storage device selected from batteries BB1, BB2 (hereinafter also referred to as a "selected sub power storage device BB") and motor-generators MG1, MG2 supply and receive electric power therebetween.

Control device 30 receives values detected by voltage sensor 10A, temperature sensor 11A and current sensor 9A, and in accordance therewith sets an SOC(BA) indicating the main power storage device's residual capacity, an upper limit on electric power input Win(M) indicating an upper limit value of electric power charged thereto, and an upper limit on electric power output Wout(M) indicating an upper limit value of electric power discharged therefrom.

Furthermore, control device 30 receives values detected by voltage sensors 10B1, 10B2, temperature sensors 11B1, 11B2 and current sensors 9B1, 9B2 and in accordance therewith sets an SOC(BB) of selected sub power storage device BB and upper limits on electric power input and output Win(S), Wout(S) thereto and therefrom, respectively.

Generally, an SOC is indicated by a ratio (%) of each battery's current charged amount to its fully charged state. Furthermore, Win, Wout are indicated as such an upper limit value of electric power that, when that electric power is discharged for a predetermined period of time (e.g., for approximately 10 seconds), the battery of interest (BA, BB1, BB2) is not overcharged/overdischarged.

Figure 4:
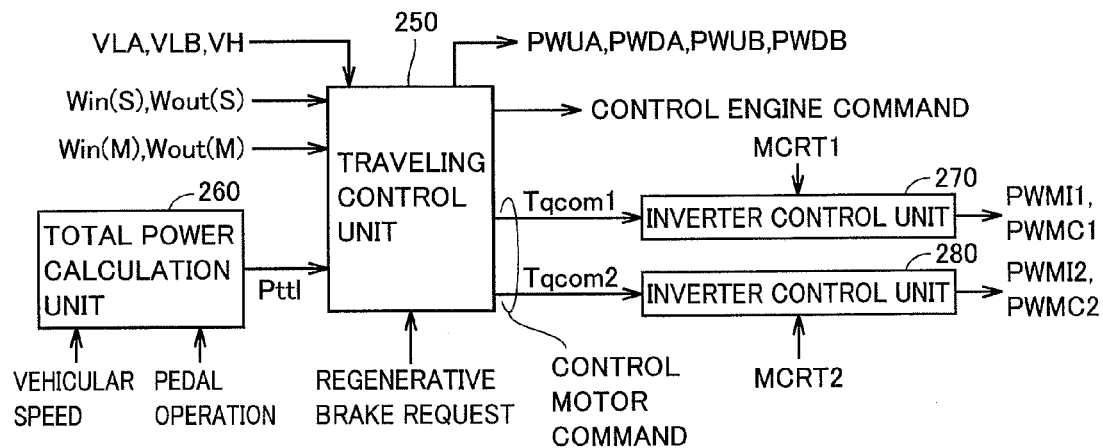
FIG. 4 is a functional block diagram for illustrating how traveling of the electrically powered vehicle is controlled.

FIG. 4 is a functional block diagram for illustrating how control device 30 controls traveling of electrically powered vehicle 1, more specifically, a configuration of power distribution control between engine 4 and motor-generators MG1, MG2. FIG. 4 shows functional blocks, which are implemented by control device 30 executing a previously stored, predetermined program and/or by processing of an operation by electronic circuitry (hardware) in control device 30.

With reference to FIG. 4, a total power calculation unit 260 calculates total power Pttl required for the entirety of electrically powered vehicle 1 from a vehicular speed and an operation of a pedal (an accelerator pedal). Note that total required power Pttl may also include power required (i.e., the engine's output), depending on a vehicle's condition, for generating electric power by motor-generator MG1 to charge a battery.

A traveling control unit 250 receives upper limits on electric power input/output Win(M), Wout(M) to/from main power storage device BA, upper limits on electric power input/output Win(S), Wout(S) to/from selected sub power storage device BB, total required power Pttl from total power calculation unit 260, and a regenerative brake request made when the brake pedal is operated. Traveling control unit 250 generates a control motor command, or torque command values Tqcom1 and Tqcom2, to allow motor-generators MG1, MG2 to in total receive/output electric power within a charging limit (Win(M)+Win(S)) and a discharging limit (Wout(M)+Wout(S)) in total for main power storage device BA and selected sub power storage device BB. Furthermore, to ensure total required power Pttl, it is assigned between power provided by motor-generator MG2 to drive the vehicle and that provided by engine 4 to do so. In particular, externally charged battery's electric power is maximally utilized to restrict engine 4 from operation or the power provided by engine 4 to drive the vehicle is set to correspond to a range allowing engine 4 to be highly efficiently operable to control the vehicle to travel to achieve high fuel-efficiency.

In order to achieve traveling control described above, traveling control unit 250 controls converters 12A, 12B such that main power storage device BA and sub power storage device BB are charged and they discharge. In order to control converters 12A, 12B, traveling control unit 250 generates control signals PWUA, PWDA, PWUB, PWDB based on voltage values VLA, VLB, VH, and outputs these control signals. For generating control signals PWUA, PWDA, PWUB, PWDB, not only voltage values VLA, VLB, VH but also current IA of the main power storage device and a current IBB of the selected sub power storage device may be used.

An inverter control unit 270 receives torque command value Tqcom1 and motor current value MCRT1 of motor-generator MG1 and therefrom generates control signals PWMI1, PWMC1 for inverter 14. Similarly, an inverter control unit 280 receives torque command value Tqcom2 and motor current value MCRT2 of motor-generator MG2 and therefrom generates control signals PWMI2, PWMC2 for inverter 22. Furthermore, traveling control unit 250 generates a control engine command in response to a value requested of power provided by the engine to drive the vehicle, as set. Furthermore, a control device (an engine ECU) (not shown) controls the operation of engine 4 in accordance with the control engine command.

When control device 30 actively uses battery's electric power to travel (i.e., in an EV mode) and total required power Pttl is equal to or smaller than the batteries' total upper limit on electric power output Wout(M)+Wout(S), engine 4 is not operated but motor-generator MG2 alone provides power to drive the vehicle to travel. When total required power Pttl exceeds Wout(M)+Wout(S), engine 4 is started.

In contrast, when the EV mode is not selected, i.e., in an HV mode, control device 30 controls distribution of driving power between engine 4 and motor-generator MG2 to maintain the batteries' SOC at a predetermined target value. In other words, traveling control under which travel with engine 4 is more actuatable than in the EV mode is carried out.

In the EV mode, charging and discharging are controlled to preferentially use the electric power of selected sub power storage device BB rather than that of main power storage device BA. As such, when the vehicle is traveling and currently used, selected sub power storage device BB is decreased in SOC, selected sub power storage device BB needs to be switched. For example, if battery BB1 is set as selected sub power storage device BB in starting the vehicle, necessity will arise to subsequently disconnect battery BB1 from converter 12B and connect battery BB2 as newly selected sub power storage device BB to converter 12B, i.e., to perform a connection switching process.

Here, battery BB2 newly set as selected sub power storage device BB is generally higher in output voltage than battery BB1 that has been used so far. Consequently, connection of a new high-voltage battery may create an unintended short-circuit path, which may give rise to a problem in protection of equipment or the like. Therefore, in the process for switching connection of the sub power storage device, sufficient attention should be paid for preventing creation of a short-circuit path. In addition, during a period for the connection switching process above, as electric power supply and electric power collection by selected sub power storage device BB cannot be carried out, charging and discharging should be restricted so as not to cause overcharge and overdischarge in the power supply system as a whole during that period.

In addition, during traveling of the electrically powered vehicle (in particular, during traveling in the EV mode), charging and discharging of the power storage device is controlled by using such parameters as a state of charge, a voltage, and a temperature of the power storage device. Discontinuous variation of the value of the aforementioned parameters along with switching of the selected sub power storage device may affect control of traveling of the electrically powered vehicle. Therefore, influence on control of traveling of the electrically powered vehicle by switching of the selected sub power storage device should be avoided.

The process for switching connection of the sub power storage device with attention being paid to such disadvantages will be described hereinafter.

Figure 5:
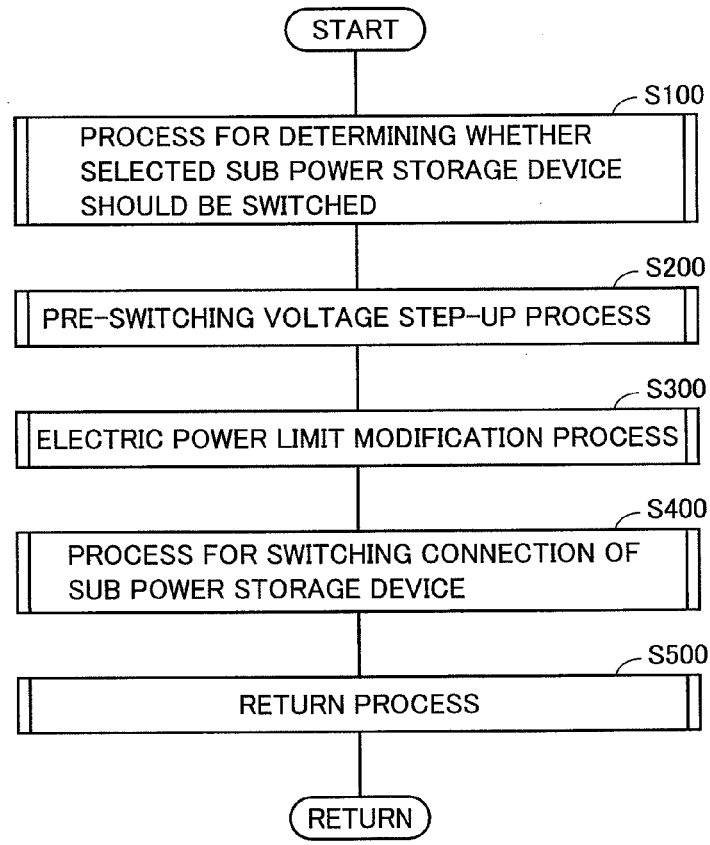
FIG. 5 is a flowchart of a general procedure of a process for switching connection of a selected sub power storage device in the power supply system of the electrically powered vehicle according to the embodiment of the present invention.

FIG. 5 is a flowchart of a general procedure of the process for switching a selected sub power storage device in the power supply system of the electrically powered vehicle according to the embodiment of the present invention. Furthermore, FIGS. 6 to 11 are flowcharts for specifically illustrating steps S100, S200, S300, S400, and S500 in FIG. 5.

Control device 30 can execute a previously stored, predetermined program periodically, as predetermined, to repeatedly perform a control processing procedure in accordance with the flowcharts shown in FIGS. 5 to 11, periodically as predetermined. The process can thus be implemented for switching connection of the sub power storage device in the power supply system of the electrically powered vehicle according to the embodiment of the present invention.

With reference to FIG. 5, in step S100, control device 30 performs a process for determining switching of a selected sub power storage device. If control device 30 determines that it is necessary to switch the selected sub power storage device, the following steps S200 to S500 are performed. If control device 30 determines in step S100 that it is not necessary to switch the selected sub power storage device, steps S200 to S500 are substantially not performed.

In step S200, control device 30 performs a pre-switching voltage step-up process, and in step S300, performs an electric power limit modification process so that a request is not generated to the power supply system to excessively charge/discharge while connection of the sub power storage device is being switched. In step S400, control device 30 performs the connection switching process for actually switching connection between selected sub power storage device BB and converter 12B, and after completion of this process, in step S500, control device 30 performs a return process to start electric power supply by newly selected sub power storage device BB.

Figure 6:
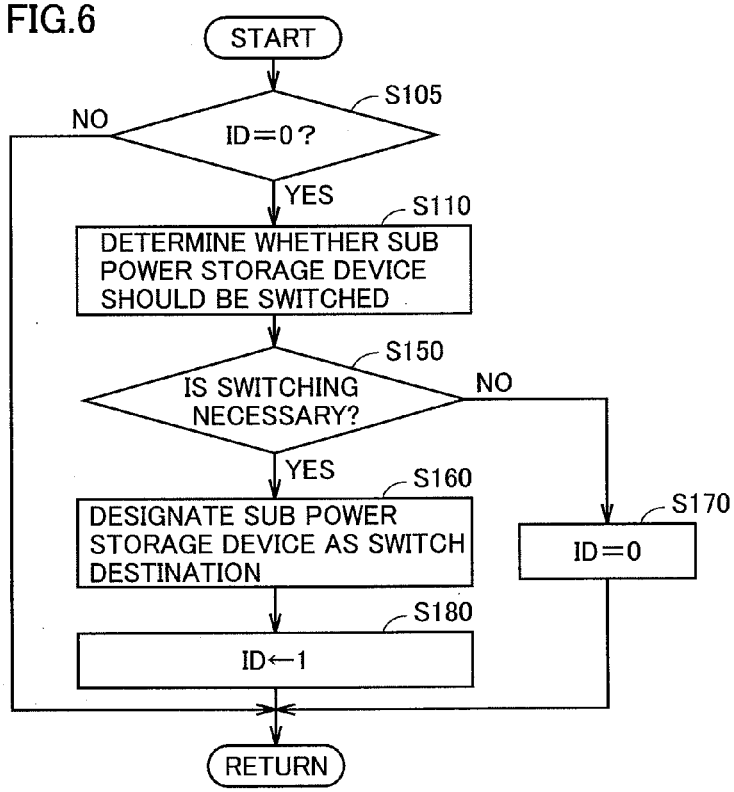
FIG. 6 is a flowchart for illustrating in detail a process performed to determine whether a sub power storage device should be switched or not, as shown in FIG. 5.

FIG. 6 is a flowchart for illustrating in detail the process in FIG. 5 performed to determine whether the selected sub power storage device should be switched or not (S100).

As will be described hereinafter, a variable ID is introduced to indicate the connection switching process's status. Variable ID is set to any of −1 and 0 to 4. ID=0 indicates a status in which no request for switching a sub power storage device is generated. In other words, when ID=0, currently selected sub power storage device BB supplies electric power, while whether selected sub power storage device BB should be switched or not is determined periodically as predetermined. Meanwhile, when there is no sub power storage device that can newly be used due to failure of equipment or consumption of electric power in the battery, it is assumed that ID=−1 is set.

With reference to FIG. 6, in step S105, control device 30 determines whether ID=0 or not. If ID=0 (YES in S105), in step S110, control device 30 makes determination as to whether the selected sub power storage device should be switched or not. Determination in step S110 is basically made based on a current SOC of selected sub power storage device BB. Namely, when the SOC of the sub power storage device in use is lower than a predetermined criterion value, determination that the selected sub power storage device should be switched is made.

In step S150, control device 30 checks a result of determination in step S110 as to whether switching should be made or not. When it is determined that switching should be made (YES in step S150), control device 30 designates in step S160, selected sub power storage device BB to newly be used. As shown in FIG. 1, in an example where two batteries BB1 and BB2 are mounted as the sub power storage devices, newly selected sub power storage device BB is automatically determined without the need to perform the processing in step S160. In the configuration in FIG. 1, however, if three or more selected sub power storage devices BB1 to BBn (n is an integer not smaller than 3) are mounted, a new sub power storage device to be used next is designated based on an SOC or the like of each of the sub power storage devices that are not currently used. Then, control device 30 sets ID=1 in order to proceed with the connection switching process. Namely, ID=1 indicates a status that a request for switching selected sub power storage device BB is generated and the switching process is started.

On the other hand, when it is determined in step S110 that switching of the selected sub power storage device is not necessary (NO in S150), control device 30 maintains ID=0 in step S170. Meanwhile, when the switching process has been started as relation of ID≥1 is once satisfied or when ID=−1 is set because there is no sub power storage device that can newly be used (NO in S105), processing in steps S110 to S180 is skipped.

Figure 7:
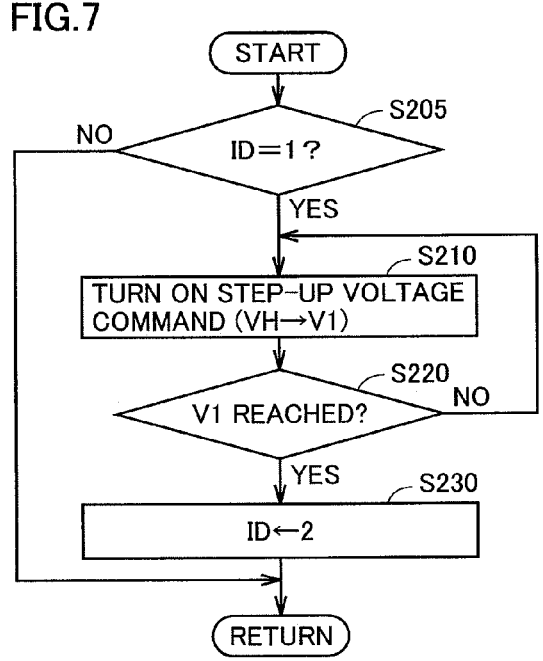
FIG. 7 is a flowchart for illustrating in detail a pre-switching voltage step-up process shown in FIG. 5.

FIG. 7 is a flowchart for illustrating in detail the pre-switching voltage step-up process (S200) shown in FIG. 5.

With reference to FIG. 7, in the pre-switching voltage step-up process, in step S205, control device 30 confirms whether ID=1 or not. If ID=1, a request for switching selected sub power storage device BB is issued and the switching process is started (YES in S205), control device 30 generates in step S210, a command to converter 12A to step up voltage VH on electric power feeding line PL2 to a predetermined voltage V1. In response to the step-up voltage command, a voltage command value VHref for electric power feeding line PL2 is set to be equal to V1, and in order to implement this voltage command value, control signal PWUA for converter 12A is generated.

Note that predetermined voltage V1 is set to be higher than any higher one of respective output voltages of main power storage device BA and selected sub power storage device BB that is newly connected (for example, BB2). For example, predetermined voltage V1 set at an upper limit control voltage VHmax that can be stepped up by converter 12A can ensure that voltage VH when a step-up voltage command is issued is higher than both of the output voltages of main power storage device BA and selected sub power storage device BB after switching. Alternatively, in view of reducing a loss caused at converter 12A, predetermined voltage V1 may be determined, as occasion demands, to have a margin, depending on voltages output from main power storage device BA and selected sub power storage device BB after switching at that time.

If a step-up voltage command is generated in step S210, in step S220, control device 30 determines based on a value detected by voltage sensor 13 whether voltage VH has reached predetermined voltage V1 or not. Determination as YES is made in step S220, for example, when VH≥V1 continues for a predetermined period of time.

Once voltage VH has reached predetermined voltage V1 (YES in S220), control device 30 furthers the ID from 1 to 2. Until voltage VH reaches V1 (NO in S220), ID=1 is held. In other words, ID=2 indicates a status in which the pre-switching voltage step-up process ends and the switching process can be furthered. If ID≠1 (NO in S205), processing in subsequent steps S210 to S230 is skipped.

Figure 8:
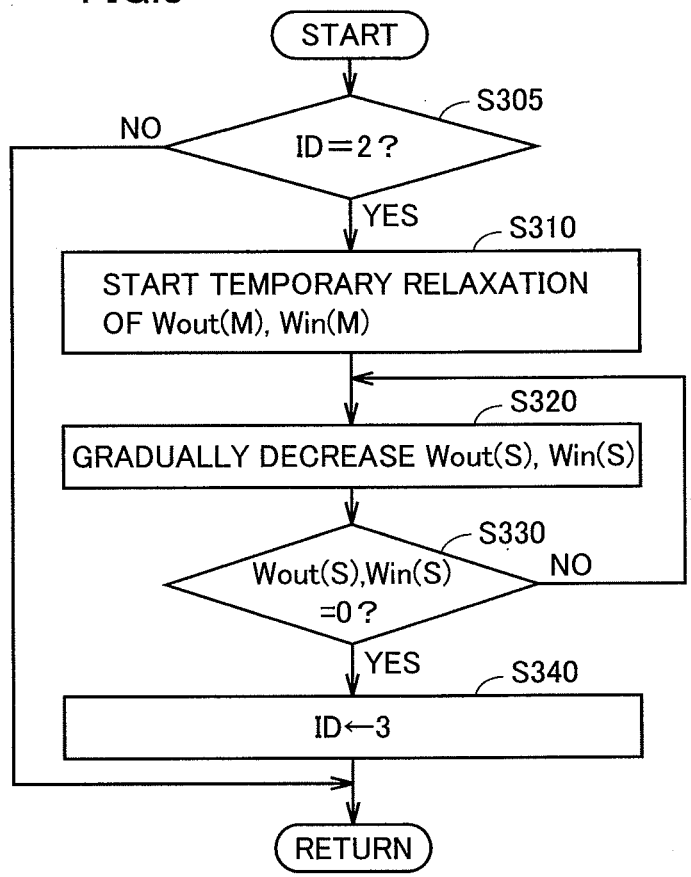
FIG. 8 is a flowchart for illustrating in detail an electric power limit modification process shown in FIG. 5.

Thus, when the pre-switching voltage step-up process (step S200) ends, control device 30 performs the electric power limit modification process as shown in FIG. 8.

FIG. 8 is a flowchart for illustrating in detail the electric power limit modification process (S300) shown in FIG. 5.

With reference to FIG. 8, in the electric power limit modification process, initially in step S305, control device 30 determines whether ID=2 or not. If ID=2 is not satisfied (NO in S305), processing in subsequent steps S310 to S340 is skipped.

If ID=2 (YES in S305), in step S310, control device 30 starts temporary relaxation of charging and discharging restriction on main power storage device BA. Specifically, absolute values of upper limits on electric power input/output Win(M), Wout(M) to/from main power storage device BA are temporarily increased.

In addition, in step S320, control device 30 gradually decreases absolute values of upper limits on electric power input/output Win(S), Wout(S) to/from selected sub power storage device BB. For example, Wout(S), Win(S) are decreased gradually toward 0 at a predetermined fixed rate.

As shown in FIG. 2, traveling control unit 250 generates torque command values Tqcom1 and Tqcom2 as control motor commands, such that input/output electric power in total of motor-generators MG1 and MG2 is within a range from a charge limit (Win(M)+Win(S)) to a discharge limit (Wout(M)+Wout(S)) in total of main power storage device BA and selected sub power storage device BB. When Wout(S), Win(S) are decreased in a stepwise fashion, an upper limit value of torque of motor-generator MG2 (power running torque and regenerative torque) discontinuously decreases. Namely, the torque of motor-generator MG2 may suddenly be limited. If such a behavior of motor-generator MG2 is transmitted to a driveshaft, for example, it may affect a behavior of the vehicle such as vibration of the vehicle. In the present embodiment, by gradually decreasing the absolute values of Wout(S), Win(S) at a predetermined fixed rate, the upper limit value of the torque of motor-generator MG2 can smoothly be lowered. Therefore, as sudden limitation of the torque of motor-generator MG2 can be avoided, influence on the behavior of the vehicle as described above can be avoided.

In step S330, control device 30 determines whether Wout(S), Win(S) have reached 0 or not. Until Wout(S)=Win(S)=0, step S320 is repeated to continuously decrease Wout(S) and Win(S).

Once Wout(S) and Win(S) have reached 0 (YES in S330), control device 30 furthers the ID from 2 to 3 in step S340. In other words, ID=3 indicates a status in which the pre-switching voltage step-up process and the electric power limit modification process have ended and switching of connection between sub power storage device BB1, BB2 and converter 12B can be started.

When the electric power limit modification process shown in FIG. 8 ends, control device 30 performs the process for switching connection of the sub power storage device in step S400.

Figure 9:
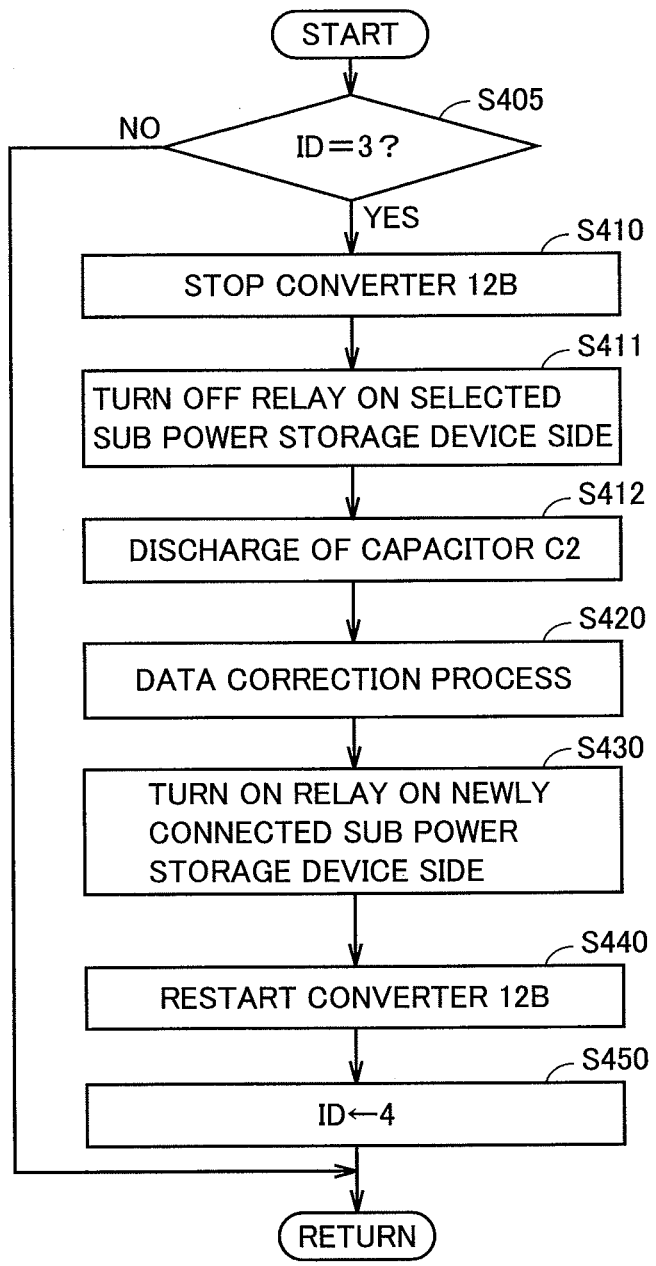
FIG. 9 is a flowchart for illustrating in detail a connection switching process shown in FIG. 5.

FIG. 9 is a flowchart for illustrating in detail the process for switching connection of the sub power storage device (S400), as shown in FIG. 5.

With reference to FIG. 9, in the process for switching connection of the sub power storage device, initially in step S405, control device 30 determines whether ID=3 or not. If ID≠3 (NO in S405), processing in subsequent steps S410 to S450 is skipped.

If ID=3 (YES in S405), in step S410, control device 30 stops converter 12B as preparation for switching connection of the sub power storage device. More specifically, in converter 12B, IGBT devices Q1, Q2 are forced to turn off in response to a shutdown command.

In step S411, control device 30 generates a relay control signal for disconnecting the selected sub power storage device from converter 12B. For example, in an example where sub power storage device BB1 is the selected sub power storage device, control device 30 generates relay control signals CONT4 and CONT6 to turn off relays SR1, SR1G.

In step S412, control device 30 causes smoothing capacitor C2 to discharge. For example, by turning on only an element in the lower arm of converter 12B (only switching element Q2 shown in FIG. 3), control device 30 causes smoothing capacitor C2 to discharge. When a value of voltage VLB detected by voltage sensor 21B decreases to a predetermined value, control device 30 determines that discharge of smoothing capacitor C2 has been completed and turns off switching element Q2.

In addition, in step S420, control device 30 performs a data correction process. Specifically, control device 30 continuously varies a value of a parameter associated with a state of the selected sub power storage device (hereinafter simply referred to as a "state parameter") from a value of the parameter of the sub power storage device before switching to a value of the parameter of the sub power storage device after switching. The parameter value is changed by varying a weight coefficient. Further, the state parameter includes a voltage of the selected sub power storage device (VBB). Furthermore, control device 30 sets the value of voltage VLB to VBB and fixes upper limits on electric power input and output Win(S), Wout(S) to 0.

Figure 10:
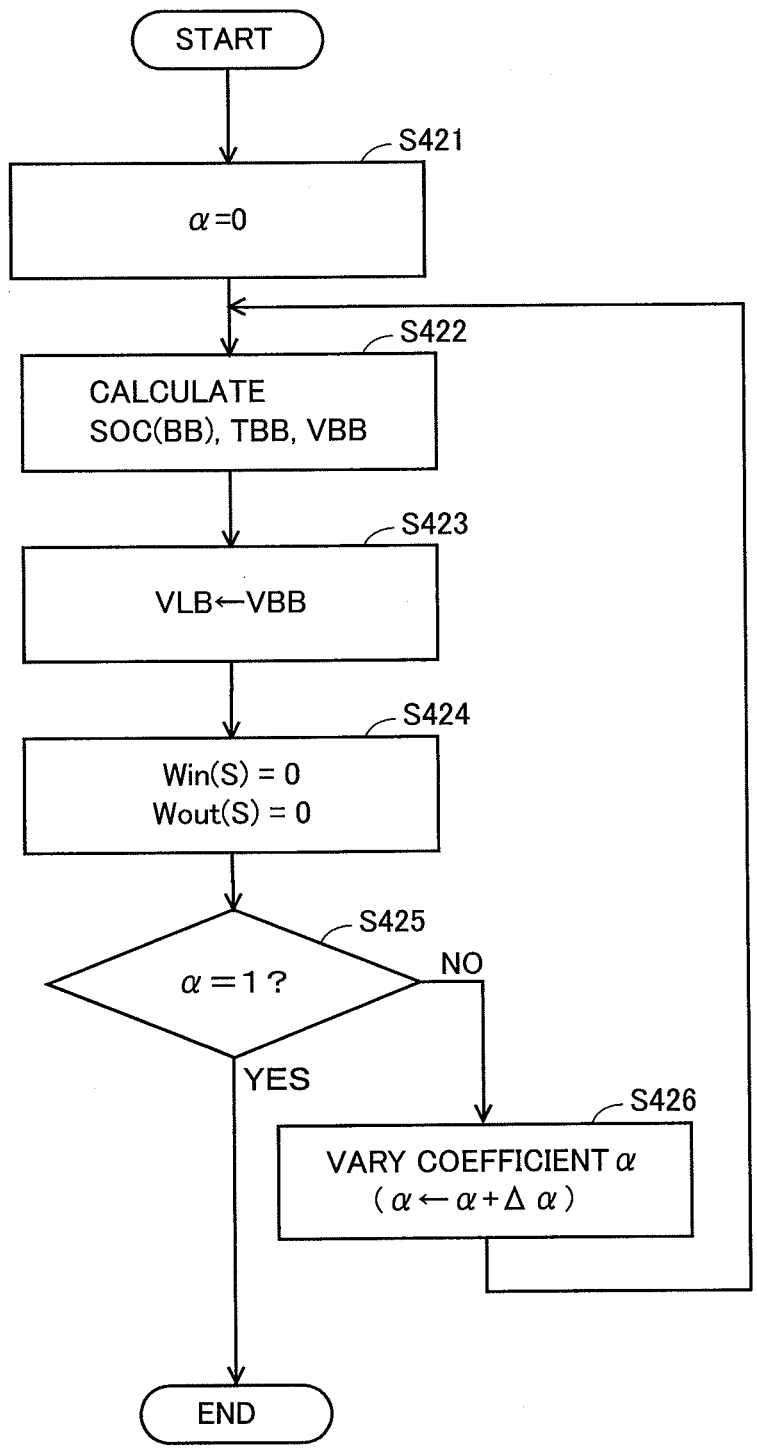
FIG. 10 is a flowchart for illustrating details of a data correction process in step S420 shown in FIG. 9.

FIG. 10 is a flowchart illustrating details of the data correction process in step S420 shown in FIG. 9. Referring to FIG. 10, in step S421, control device 30 sets an initial value of a weight coefficient α to 0.

In step 422, control device 30 calculates SOC(BB), TBB and VBB as state parameters during a period in which the selected sub power storage device is switched. A value of the state parameter before switching of the selected sub power storage device is denoted as A1, while a value of the state parameter after switching of the selected sub power storage device is denoted as A2. Control device 30 calculates a value B of the state parameter during a period in which the selected sub power storage device is switched in accordance with the following equation.

$$B = (1-\alpha) \Delta A1 + \alpha \times A2$$

By gradually varying weight coefficient α from 0 to 1 (by increasing α by +Δα), the value of the state parameter can smoothly be varied from A1 to A2 during a period in which the selected sub power storage device is switched. Therefore, influence on control of traveling of the electrically powered vehicle can be less. It is noted that a state parameter to be varied in the processing in step S422 is not limited to each of SOC(BB), TBB and VBB or combination thereof, but a state parameter can appropriately be selected from those required in control of traveling of the electrically powered vehicle.

In step S423, control device 30 sets the value of input voltage VLB of converter 12B to the value of voltage VBB. As a result of discharge of smoothing capacitor C2, a value detected by voltage sensor 21B is substantially 0. When the value detected by voltage sensor 21B is used as the value of input voltage VLB of converter 12B in spite of the detection value being 0, for example, converter 12B is determined as abnormal and thus the entire vehicle system may be affected. By setting the value of voltage VBB calculated in the processing in step S422 to the value of input voltage VLB of converter 12B, influence on the vehicle system (for example, influence on control of traveling) can be avoided.

In step S424, control device 30 fixes the value of each of Wout(S) and Win(S) to 0. For example, for starting engine 4 or for controlling the value of the SOC of the selected sub power storage device so as to maintain the same at a predetermined value, it is possible to set Wout(S), Win(S) to a value greater than 0. If control for switching the sub power storage device is carried out while electric power is input/output to/from the sub power storage device, a large current instantaneously flows through the relay provided in correspondence with the sub power storage device, which results in adhesion of the relay. If adhesion of the relay occurs, it becomes difficult to switch the selected sub power storage device.

Therefore, during a period in which the selected sub power storage device is switched (more specifically, during a period before Wout(S) and Win(S) are recovered), Wout(S) and Win(S) are fixed to 0. Switching of the selected sub power storage device can thus be ensured.

In step S425, control device 30 determines whether weight coefficient α has reached 1 or not. When weight coefficient α is equal to 1 (YES in step S425), the process in step S420 ends. When weight coefficient α is smaller than 1 (NO in step S425), control device 30 increases weight coefficient α by +Δα in step S426. It is noted in the present embodiment that an increment value +Δα is assumed as a constant value. When the processing in step S426 ends, the entire process returns to step 422.

Referring back to FIG. 9, in step S430, control device 30 generates a relay control signal for connecting a new sub power storage device to converter 12B. For example, in order to connect battery BB2 to converter 12B, control device 30 generates relay control signals CONT5, CONT7 to turn on relays SR2, SR2G.

Furthermore, in step S430, control device 30 determines whether relay connection switching indicated in step S420 has been completed or not. When connection switching has been completed (YES in S430), in step S440, control device 30 restarts converter 12B to start a switching operation, and in step S450, control device 30 furthers the ID from 3 to 4.

In other words, ID=4 indicates a status in which switching of connection by a relay between the sub power storage device and converter 12B has been completed.

When the connection switching process in step S400 ends, control device 30 performs the return process in step S500.

Figure 11:
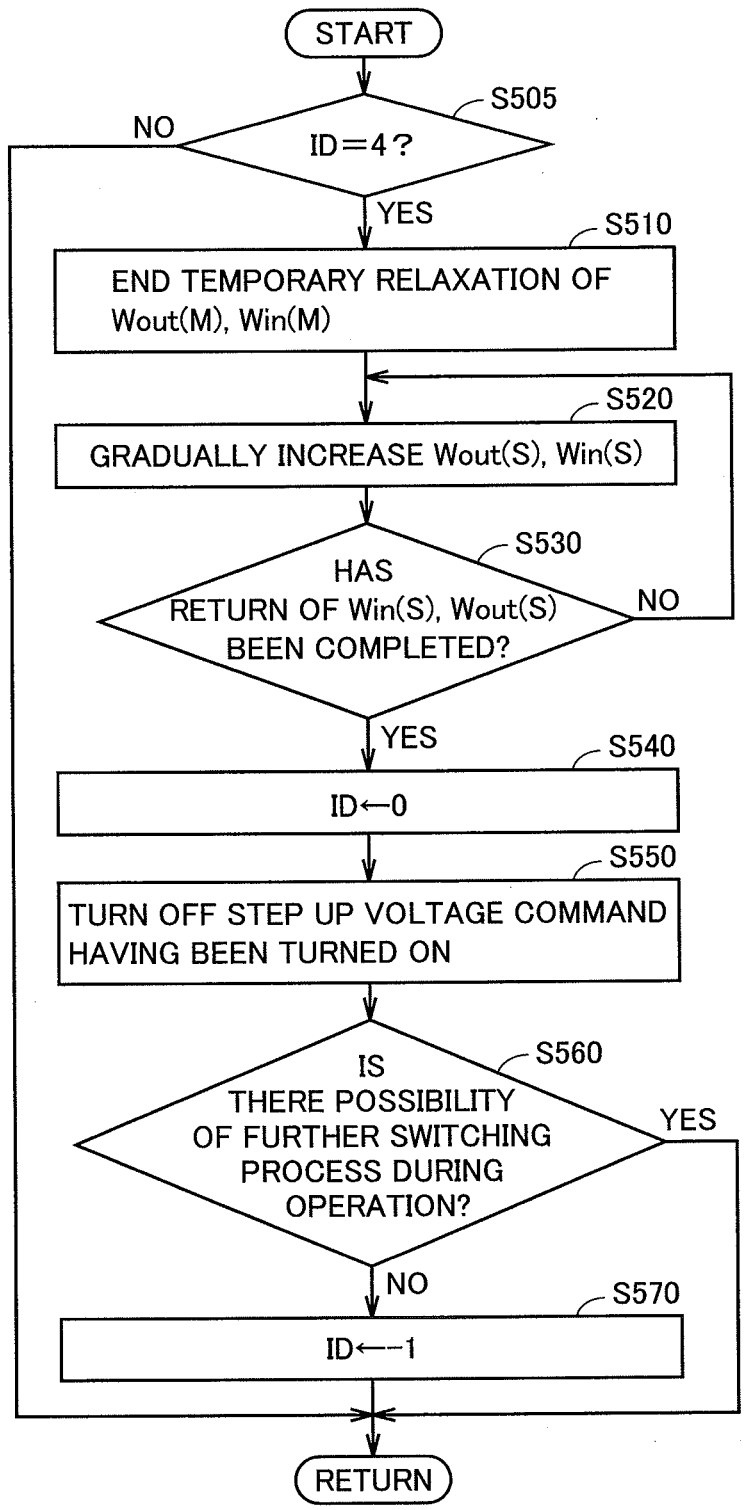
FIG. 11 is a flowchart for illustrating details of a return process shown in FIG. 5.

FIG. 11 is a flowchart for illustrating details of the return process (S500) shown in FIG. 5.

Referring to FIG. 11, in the return process, initially in step S505, control device 30 determines whether ID=4 or not. If ID≠4 (NO in S505), processing in subsequent steps S510 to S570 is skipped.

If ID=4 (YES in S505), in step S510, control device 30 ends temporary relaxation of charging and discharging restriction on main power storage device BA started in step S310 (FIG. 7). Thus, Wout(M) and Win(M) basically return to values prior to start of the process for switching selected sub power storage device BB.

In addition, control device 30 gradually increases upper limits on electric power input/output Win(S), Wout(S) to/from selected sub power storage device BB lowered to 0 in the electric power limit process (step S300) to values of Win, Wout of a newly selected sub power storage device (for example, battery BB2). Control device 30 varies Win(S), Wout(S) such that Wout(S), Win(S) gradually increase at a predetermined fixed rate. When Wout(S), Win(S) are increased in a stepwise fashion, an upper limit value of torque of motor-generator MG2 (power running torque and regenerative torque) discontinuously increases, which may affect a behavior of the vehicle. Therefore, as in decrease of Wout(S), Win(S), absolute values of Wout(S), Win(S) are gradually increased at a predetermined fixed rate. Thus, the upper limit value of the torque of motor-generator MG2 can smoothly be increased, so that influence on a behavior of the vehicle can be avoided.

In step S530, control device 30 checks whether upper limits on electric power input and output Win(S), Wout(S) have returned to the values of Win, Wout of newly selected sub power storage device BB or not. During a period until completion of return (NO in S530), step S520 is repeatedly performed and upper limits on electric power input and output Win(S), Wout(S) gradually increase at a fixed rate.

When return of upper limits on electric power input and output Win(S), Wout(S) is completed (YES in S530), control device 30 changes the ID again to 0 in step S540. Thus, in the power supply system, a state that normal electric power supply and electric power collection by main power storage device BA and newly selected sub power storage device BB can be carried out is reproduced.

In addition, the process proceeds to step S550 and control device 30 turns off the voltage step-up command generated in step S210 (FIG. 6). Thus, the voltage command value for electric power feeding line PL2 is also set to a normal value set in accordance with a state of motor-generator MG1, MG2.

It is noted that, in step S550, control device 30 may end the control process for replacing voltage VLB with voltage VBB. This control process can be ended at the timing when influence on control of converter 12B is less likely.

When a series of switching processes is completed, control device 30 may further determine in step S560 whether or not there is possibility that the selected sub power storage device is further switched during traveling of the vehicle. When there is no possibility of further switching, control device 30 sets ID=−1 in step S570. When ID=−1 is set, steps S100 to S500 in FIG. 5 are substantially not performed. Therefore, the process for switching the selected sub power storage device is not started until the operation of the vehicle ends.

On the other hand, when there is possibility of further switching, control device 30 skips step S570 and maintains ID=0. Consequently, as the switching determination process in step S100 is performed in a predetermined cycle, the process for switching the selected sub power storage device is resumed as necessary.

In the configuration example in FIG. 1 where only two sub power storage devices are mounted, the processing in step S560 can be skipped. Namely, once the process for switching the selected sub power storage device is completed, setting as ID=−1 is always made and the number of times of the process performed for switching the selected sub power storage device during the operation of the vehicle can be limited to only one.

Alternatively, a power supply system on which three or more sub power storage devices are mounted or a power supply system configured such that a sub power storage device not in use can be charged during the operation of the vehicle may be configured such that the process for switching the selected sub power storage device can be executed two times or more by maintaining ID=0, depending on a situation.

Figure 12:
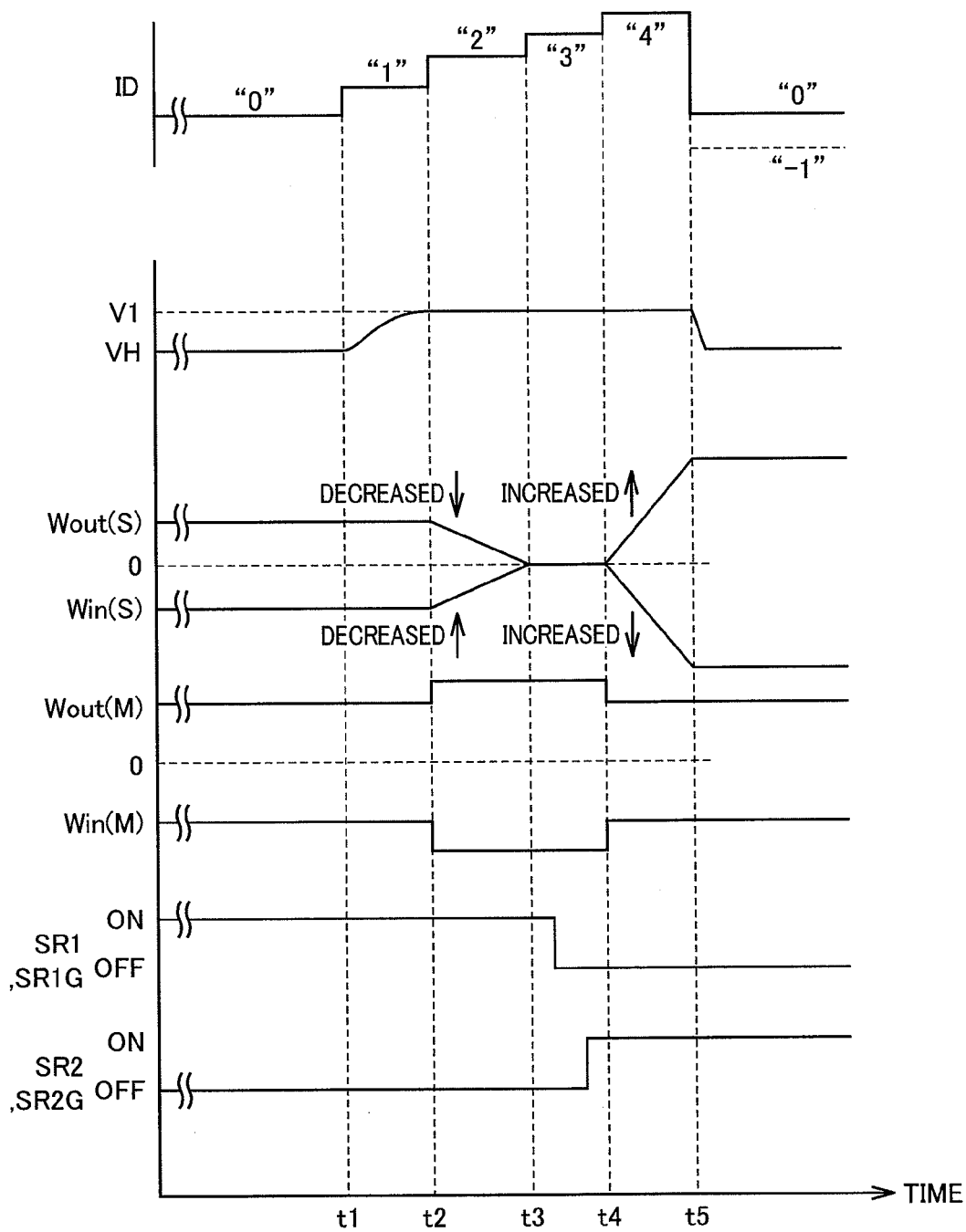
FIG. 12 is a waveform diagram of an operation performed in the process for switching a selected sub power storage device in the power supply system of the electrically powered vehicle according to the embodiment of the present invention.

FIG. 12 shows an operation waveform in the process for switching the selected sub power storage device in the power supply system of the electrically powered vehicle according to the embodiment of the present invention described with reference to FIGS. 5 to 11.

With reference to FIG. 12, during a period until time t1 when ID=0, the switching determination process is performed periodically as predetermined, based on the SOC of the currently selected sub power storage device (e.g., battery BB1).

At time n, in response to lowering in the SOC of battery BB1, the switching determination process (step S100) is performed to issue a request to switch selected sub power storage device BB and ID=1 is also set to start the switching process.

Thus, the pre-switching voltage step-up process (step S200) is performed and converter 12A increases voltage VH on electric power feeding line PL2 toward predetermined voltage V1. Processing for stepping up voltage on electric power feeding line PL2 is completed at time t2, and accordingly, the ID is changed from 1 to 2.

When ID=2 is set, the electric power limit modification process (S300) is performed to temporarily relax charging and discharging to/from main power storage device BA. Namely, temporary increase in absolute values of upper limits on electric power input/output Win(M), Wout(M) is started. In addition, upper limits on electric power input/output Win(S), Wout(S) to/from selected sub power storage device BB are decreased toward 0 gradually at a fixed rate. It is noted that, during this period, converter 12B is controlled to stop charging/discharging to/from the currently selected sub power storage device (battery BB1). Alternatively, converter 12B may be shut down from time t1.

At time t3, upper limits on electric power input/output Win(S), Wout(S) to/from selected sub power storage device BB are lowered to 0, and in response, the ID is changed from 2 to 3. Once ID=3 is set, the process for switching connection of the sub power storage device starts. More specifically, with converter 12B being shut down, relays SR1, SR1G are turned off and thereafter relays SR2, SR2G are turned on. Then, when the process for switching connection by means of the relay is completed and battery BB2 which is a newly selected sub power storage device is connected to converter 12B, converter 12B is restarted. By completing this connection switching process, the ID is changed from 3 to 4 at time t4.

When ID=4 is set, upper limits on electric power input/output Win(S), Wout(S) to/from selected sub power storage device BB are gradually increased at a fixed rate, so that use of battery BB2 which is a newly selected sub power storage device is started. Accordingly, temporary relaxation of charging and discharging restriction on main power storage device BA is ended and Wout(M), Win(M) are basically caused to return to the values at time t2 and before.

Then, when Win(S), Wout(S) of selected sub power storage device BB return to original values corresponding to Wout, Win of battery BB2 at time t5 respectively, return to ID=0 is made. Then, the processing for stepping up voltage on electric power feeding line PL2 is also stopped.

Thus, a series of processes for switching the selected sub power storage device ends and a state that normal electric power supply and electric power collection with the use of selected sub power storage device BB (battery BB2) can be carried out is reproduced.

At time t5, when there is no possibility of the switching process as a result of determination as to the possibility of the process for further switching the sub power storage device during the operation of the vehicle as described in connection with FIG. 11, load subsequently imposed on control device 30 can be alleviated by setting ID=−1.

Figure 13:
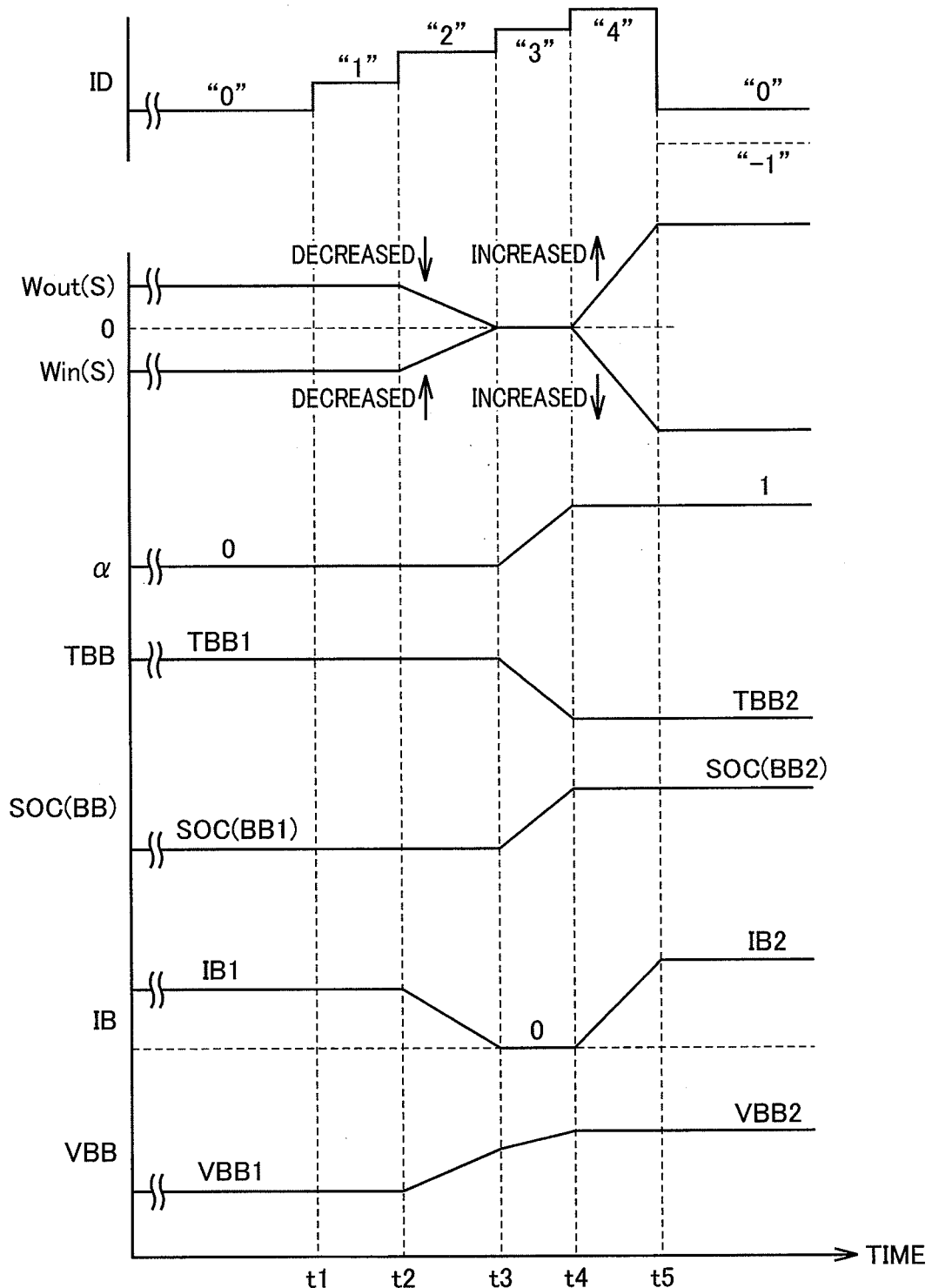
FIG. 13 is a diagram showing variation of a state parameter during a period for the process for switching the selected sub power storage device shown in FIG. 12.

FIG. 13 is a diagram showing variation of a state parameter during a period for the process for switching the selected sub power storage device shown in FIG. 12. Referring to FIG. 13, weight coefficient α is set to 0 at time t3 and before and it is varied from 0 to 1 during a period from time t3 to time t4 (during a period in which ID=3).

Temperature TBB, SOC(BB), and voltage VBB vary in accordance with weight coefficient α. Specifically, at time t3 and before, temperature TBB, SOC value SOC(BB), and voltage VBB are at temperature TBB1, SOC(BB1), and voltage VBB1, respectively. During a period from time t2 to time t3, voltage VBB1 increases in accordance with lowering in Wout(S), Win(S).

During a period from time t3 to time t4, temperature TBB continuously varies from TBB1 to TBB2. Similarly, SOC (BB) continuously varies from SOC(BB1) to SOC(BB2), and voltage VBB continuously varies from VBB1 to VBB2.

At time t4 and later, as weight coefficient α is set to 1, the state parameter of sub power storage device BB2 is adopted as the state parameter of the selected sub power storage device. Namely, temperature TBB, SOC(BB), and voltage VBB are at TBB2, SOC(BB2), and VBB2, respectively.

In addition, current IB of the selected sub power storage device varies in accordance with Wout(S), Win(S). Specifically, as Wout(S), Win(S) are lowered during a period from time t2 to time t3, current IB (IB1) is lowered. During a period from time t3 to time t4, as Wout(S), Win(S) are fixed to 0, current IB remains at 0. During a period from time t4 to time t5, as Wout(S), Win(S) increase, current IB (IB2) increases.

Figure 14:
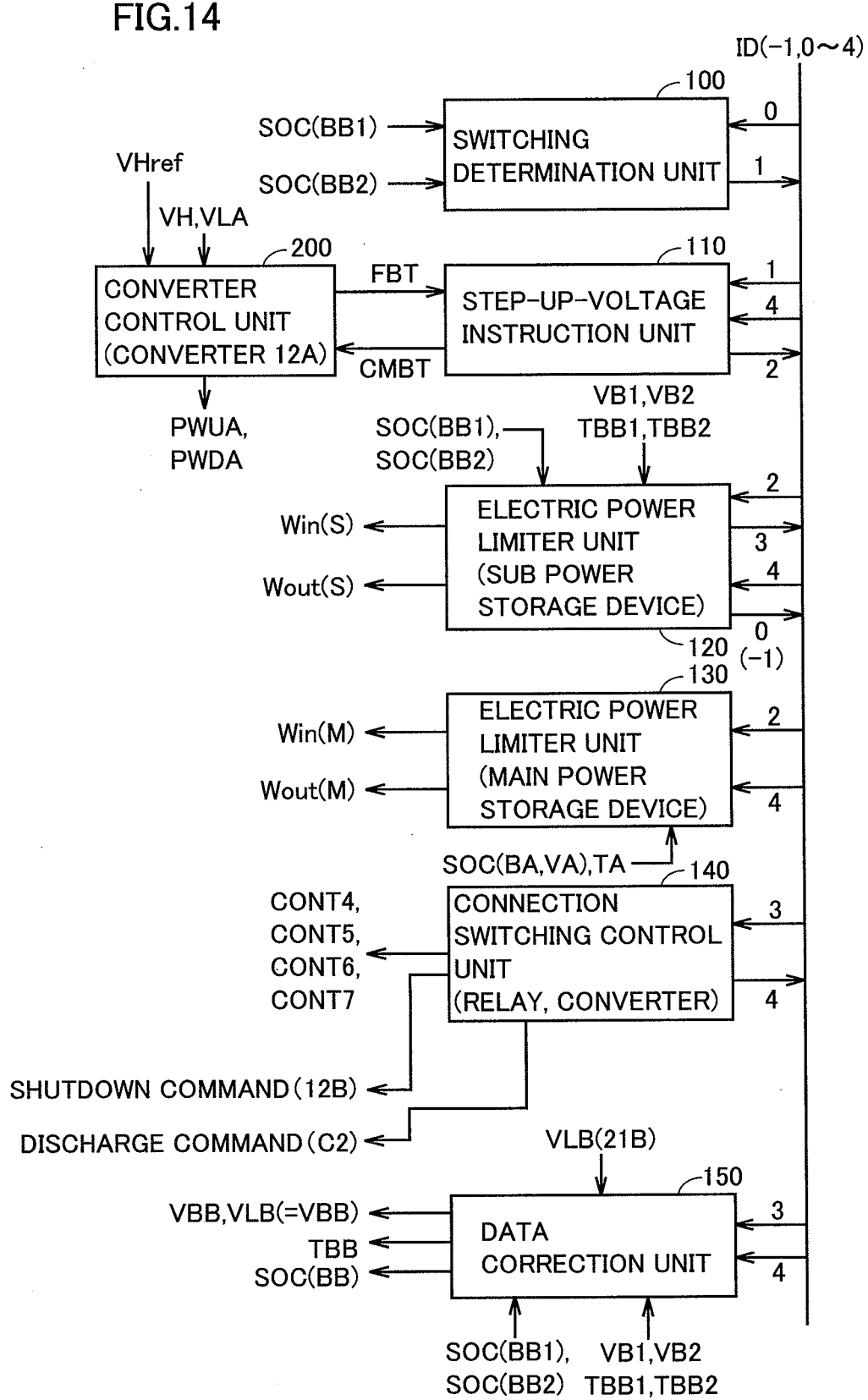
FIG. 14 is a functional block diagram for illustrating a functional portion for the process for switching the selected sub power storage device, in a configuration for controlling the power supply system according to the embodiment of the present invention.

A configuration of a functional portion for the process for switching the selected sub power storage device described in connection with FIGS. 5 to 11, representing a part of a control configuration of the power supply system according to the embodiment of the present invention will now be described with reference to FIG. 14. FIG. 14 shows functional blocks, which are implemented as control device 30 executing a predetermined program to provide software processing, or by dedicated electronic circuitry (or hardware processing).

With reference to FIG. 14, a switching determination unit 100 receives SOC(BB1), SOC(BB2) indicating the states of charge respectively of batteries BB1, BB2 and determines whether the SOC of currently used selected sub power storage device BB is lower than a predetermined criterion value or not. When variable ID shared by the functional blocks is set to 0, switching determination unit 100 performs the determination process above in a predetermined cycle, and when the selected sub power storage device should be switched, switching determination unit 100 changes the ID from 0 to 1. Thus, a request for switching the selected sub power storage device is generated. In other words, switching determination unit 100 has a function corresponding to the process in step S100 in FIG. 5.

When a request is generated to switch the selected sub power storage device and ID=1 is set, a step-up-voltage instruction unit 110 outputs a step-up voltage command signal CMBT to a converter control unit 200 controlling converter 12A.

Converter control unit 200 generates control signals PWUA, PWDA for converter 12A based on voltages VH, VLA and voltage command value VHref, so that voltage VH on electric power feeding line PL2 reaches voltage command value VHref.

Furthermore, when step-up-voltage instruction unit 110 generates step-up voltage command signal CMBT, converter control unit 200 sets voltage command value VHref=V1 and generates control signal PWUA. If voltage sensor 13 detects voltage VH having reached predetermined voltage V1 continuously for at least a predetermined period of time, converter control unit 200 sets a flag FBT to ON indicating that stepping up voltage is completed.

In response to flag FBT set to ON, step-up-voltage instruction unit 110 sets ID=2 and continues to output step-up voltage command signal CMBT until a connection switching control unit 140, which will be described later, completes relay connection switching and ID=4 is set. In other words, step-up-voltage instruction unit 110 has a function corresponding to step S200 in FIG. 5 and step S540 in FIG. 11.

An electric power limiter unit 120 sets upper limits on electric power input/output Win(S), Wout(S) to/from selected sub power storage device BB. Normally, upper limits on electric power input/output Win(S), Wout(S) are set based on selected sub power storage device BB or battery's SOC (SOC (BB1) or SOC(BB2)), temperature (TBB1 or TBB2) and an output voltage (VB1 or VB2).

In the process for switching the selected sub power storage device, in contrast, when ID=2 is set, electric power limiter unit 120 decreases upper limits on electric power input/output Win(S), Wout(S) gradually at a fixed rate toward 0, and when Win(S), Wout(S) have reached 0, electric power limiter unit 120 changes the ID from 2 to 3. In addition, during a period when the ID is reaching 3, electric power limiter unit 120 fixes upper limits on electric power input/output Win(S), Wout(S) to 0. Moreover, when connection switching control unit 140 sets ID=4, electric power limiter unit 120 increases upper limits on electric power input/output Win(S), Wout(S) to values corresponding to Win, Win of newly selected sub power storage device BB after switching. Then, when the increase processing is completed, ID is changed from 4 to 0.

Namely, the function of electric power limiter unit 120 corresponds to the processing in steps S320 to S340 in FIG. 8, the processing in step S424 in FIG. 10, and the processing in steps S520 to S540 in FIG. 11. Electric power limiter unit 120 implements the functions of the "first electric power limiter unit," the "second electric power limiter unit," and the "upper limit value fixing unit" of the present invention.

An electric power limiter unit 130 sets upper limits on electric power input/output Win(M), Wout(M) to/from main power storage device BA. Normally, upper limits on electric power input/output Win(M), Wout(M) are set based on main power storage device BA's SOC(BA), battery temperature TA, and output voltage VA.

In contrast, during the process for switching the selected sub power storage device, when ID=2 is set, electric power limiter unit 130 temporarily increases absolute values of upper limits on electric power input and output Win(M) and Wout(M), so as to temporarily relax charging and discharging restriction on main power storage device BA. Then, when connection switching control unit 140 sets ID=4, electric power limiter unit 130 causes upper limits on electric power input and output Win(M) and Wout(M) to return to normal values.

Namely, the function of electric power limiter unit 130 corresponds to the processing in step S310 in FIG. 8 and the processing in step S510 in FIG. 11. In addition, electric power limiter unit 130 implements the function of the "third electric power limiter unit" of the present invention.

When electric power limiter unit 120 sets ID=3, connection switching control unit 140 generates a command for shutting down converter 12B. In addition, connection switching control unit 140 generates a discharge command such that converter 12B causes smoothing capacitor C2 to discharge. Moreover, connection switching control unit 140 generates relay control signals CONT4 to CONT7 so as to switch connection between converter 12B and sub power storage device BB1, BB2. For example, in switching selected sub power storage device BB from battery BB1 to battery BB2, relay control signals CONT4 to CONT7 are generated so as to turn off relays SR1, SR1G and to turn on relays SR2, SR2G. Then, when this relay connection switching process is completed, a shutdown state of converter 12B ends. Then, connection switching control unit 140 restarts converter 12B and changes the ID from 3 to 4.

Connection switching control unit 140 performs the process in step S400 in FIG. 5 (S405 to S412 and S430 to S450 in FIG. 9). In addition, connection switching control unit 140 implements the functions of the "switching control unit" and the "discharge control unit" of the present invention.

When electric power limiter unit 120 sets ID=3, data correction unit 150 continuously varies weight coefficient α from 0 to 1, so as to continuously vary the state parameter (SOC(BB), TBB and VBB) of selected sub power storage device BB from the state parameter (SOC(BB1), TBB1 and VBB1) before switching to the state parameter (SOC(BB2), TBB2 and VBB2) after switching. In addition, data correction unit 150 changes the value of voltage VLB from the value detected by voltage sensor 21B to the calculated value of VBB. Namely, data correction unit 150 performs the process in step S420 in FIG. 9 (specifically, the processing in steps S421 to S423, S425, and S426 in FIG. 10).

As described above, according to the power supply system of the electrically powered vehicle in the present embodiment, during the process for switching the selected sub power storage device, upper limits on electric power input/output Win(S), Wout(S) to/from selected sub power storage device BB are continuously varied. Thus, discontinuous variation of electric power input/output to/from the power supply system during the process for switching the selected sub power storage device can be avoided. Consequently, sudden change in a behavior of the electrically powered vehicle can be avoided. Namely, according to the present embodiment, in the power supply system configured such that a plurality of sub power storage devices are shared by a single voltage converter (converter), the process for switching connection of the sub power storage device in switching the selected sub power storage device can appropriately and smoothly be performed.

In addition, according to the power supply system of the electrically powered vehicle in the present embodiment, during the process for switching the selected sub power storage device, the state parameter of selected sub power storage device BB is continuously varied. Thus, instability of control of traveling of the electrically powered vehicle based on the state parameter during the process for switching the selected sub power storage device can be prevented.

Moreover, according to the power supply system of the electrically powered vehicle in the present embodiment, during the process for switching the selected sub power storage device, an input voltage for the converter corresponding to selected sub power storage device BB is changed from a voltage across ends of the smoothing capacitor to the voltage of selected sub power storage device BB. In controlling a converter, in general, an input voltage and an output voltage thereof are used. On the other hand, in order to switch the selected sub power storage device, the smoothing capacitor should discharge. Therefore, when a converter is controlled with the voltage of the smoothing capacitor being adopted as the input voltage for the converter, divergence of control may occur. According to the present embodiment, as the input voltage for the converter is replaced with the voltage of selected sub power storage device BB during discharge of the smoothing capacitor, instability of converter control can be prevented. Further, instability of control of traveling of the electrically powered vehicle can be prevented.

Furthermore, according to the power supply system of the electrically powered vehicle in the present embodiment, during the process for switching the selected sub power storage device, upper limits on electric power input/output to/from selected sub power storage device BB are fixed to 0. When upper limits on electric power input/output to/from selected sub power storage device BB are not 0, for example, electric power is output from the selected sub power storage device and it is likely that switching of the selected sub power storage device cannot be made (for example, adhesion of a relay or the like). According to the present embodiment, such a problem can be avoided.

In addition, according to the present embodiment, during a period from start of decrease in the upper limit values on electric power input and output until completion of switching of connection between the plurality of sub power storage devices and converter 12B, charging and discharging restriction on main power supply device BA is temporarily relaxed. Thus, during a period in which electric power input/output to/from the sub power storage device cannot be made due to switching of connection of the sub power storage device, restriction of charged and discharged electric power imposed on the main power storage device is temporarily relaxed, so that upper limits on electric power input and output in the entire power supply system can be ensured.

Moreover, according to the present embodiment, the electrically powered vehicle further includes engine 4 configured to be able to output power to drive the vehicle independently of motor-generator MG2 and traveling control unit 250. Traveling control unit 250 starts the engine when the total required power of the vehicle is greater than the sum of the upper limit value of electric power output from main power storage device BA and the upper limit value of electric power output from the selected sub power storage device. Therefore, by appropriately setting the upper limit values of electric power input and output at the time of switching connection of the sub power storage device, a request to the power supply system for excessive charging and discharging cannot be issued. In addition, by temporarily relaxing charging and discharging restriction on the main power storage device, start again of the internal combustion engine at the time of switching connection of the sub power storage device can be prevented.

In the present embodiment, an electrically powered vehicle incorporating a series/parallel hybrid system in which motive power of an engine can be divided for transmission to driving wheels and a generator by means of a power split device has been shown. The present invention, however, is also applicable, for example, to a series hybrid vehicle in which an engine is used only for driving a generator and driving force for an axle shaft is generated only by a motor using electric power generated by the generator, an electric car, and a fuel cell car. As these vehicles all incorporate a motor generating power to drive the vehicle and a power storage device, the present invention is applicable thereto.

It should be understood that the embodiments disclosed herein are illustrative and non-restrictive in every respect. The scope of the present invention is defined by the terms of the claims, rather than the description above, and is intended to include any modifications within the scope and meaning equivalent to the terms of the claims.

The invention claimed is:

1. A power supply system for an electrically powered vehicle incorporating a motor for generating power to drive the vehicle, comprising:
   a main power storage device;
   an electric power feeding line configured to feed electric power to an inverter for driving and controlling said motor;
   a first voltage converter provided between said electric power feeding line and said main power storage device, and configured to convert voltage therebetween bidirectionally;
   a plurality of sub power storage devices provided in parallel to each other;
   a second voltage converter provided between said plurality of sub power storage devices and said electric power feeding line, and configured to convert voltage between one of said plurality of sub power storage devices and said electric power feeding line bidirectionally;
   a connection unit provided between said plurality of sub power storage devices and said second voltage converter, and configured to selectively connect a sub power storage device selected from said plurality of sub power storage devices to said second voltage converter; and
   a switching control device for controlling selective connection between said plurality of sub power storage devices and said second voltage converter,
   said switching control device including
      a switching determination unit configured to determine whether said selected sub power storage device should be switched based on a state of charge of each of said plurality of sub power storage devices,
      a first electric power limiter unit configured to continuously decrease upper limit values on electric power input and output to and from said selected sub power storage device to 0 when said switching determination unit determines that said selected sub power storage device should be switched,
      a switching control unit configured to switch connection between said plurality of sub power storage devices and said second voltage converter when said upper limit values on electric power input and output have reached 0, and
      a second electric power limiter unit configured to continuously increase said upper limit values on electric power input and output to values corresponding to a state of charge of a sub power storage device newly connected to said second voltage converter after said switching control unit switched connection between said plurality of sub power storage devices and said second voltage converter.

2. The power supply system for an electrically powered vehicle according to claim 1, wherein
   said switching control device further includes a data correction unit configured to perform a correction process for correcting a value of a parameter associated with said selected sub power storage device during a period in which connection between said plurality of sub power storage devices and said second voltage converter is switched, and said data correction unit continuously varies said value of said parameter from a first value associated with a sub power storage device disconnected from said second voltage converter to a second value associated with said newly connected sub power storage device while said correction process is performed.

3. The power supply system for an electrically powered vehicle according to claim 2, wherein said electrically powered vehicle includes a traveling control unit configured to control said second voltage converter by using a value of an input voltage for said second voltage converter while said electrically powered vehicle is traveling, said parameter includes a voltage of said selected sub power storage device, said power supply system further comprises a capacitor for smoothing said input voltage for said second voltage converter and a voltage detection unit for detecting said input voltage, said switching control device further includes a discharge control unit configured to cause said capacitor to discharge prior to switching of said selected sub power storage device, and said data correction unit provides to said traveling control unit, a voltage value of said selected sub power storage device calculated in said correction process as a value of said input voltage, instead of a value detected by said voltage detection unit, after said discharge control unit caused said capacitor to discharge.

4. The power supply system for an electrically powered vehicle according to claim 1, wherein said switching control device further includes an upper limit value fixing unit configured to maintain said upper limit values on electric power input and output at 0 during a period in which connection between said plurality of sub power storage devices and said second voltage converter is switched.

5. The power supply system for an electrically powered vehicle according to claim 1, wherein said switching control device further includes a third electric power limiter unit configured to temporarily relax charging and discharging restriction on said main power storage device during a period from start of decrease in said upper limit values on electric power input and output by said first electric power limiter unit until completion of switching of connection between said plurality of sub power storage devices and said second voltage converter by said connection unit.

6. The power supply system for an electrically powered vehicle according to claim 1, wherein said electrically powered vehicle further includes an internal combustion engine configured to be able to output power to drive the vehicle independently of said motor, and a traveling control unit configured to start said internal combustion engine when total required power of said electrically powered vehicle is greater than a sum of an upper limit value on electric power output from said main power storage device and an upper limit value on electric power output from said selected sub power storage device.

7. A method for controlling a power supply system of an electrically powered vehicle incorporating a motor for generating power to drive the vehicle, said power supply system including a main power storage device, an electric power feeding line configured to feed electric power to an inverter for driving and controlling said motor, a first voltage converter provided between said electric power feeding line and said main power storage device, and configured to convert voltage therebetween bidirectionally, a plurality of sub power storage devices provided in parallel to each other, a second voltage converter provided between said plurality of sub power storage devices and said electric power feeding line, and configured to convert voltage between one of said plurality of sub power storage devices and said electric power feeding line bidirectionally, a connection unit provided between said plurality of sub power storage devices and said second voltage converter, and configured to selectively connect a sub power storage device selected from said plurality of sub power storage devices to said second voltage converter, and a switching control device for controlling selective connection between said plurality of sub power storage devices and said second voltage converter, said method comprising the steps of:

determining, with the switching control device, whether said selected sub power storage device should be switched based on a state of charge of each of said plurality of sub power storage devices;

continuously decreasing upper limit values on electric power input and output to and from said selected sub power storage device to 0 when it is determined in said determining step that said selected sub power storage device should be switched;

switching connection between said plurality of sub power storage devices and said second voltage converter when said upper limit values on electric power input and output have reached 0 in said step of decreasing; and continuously increasing said upper limit values on electric power input and output to values corresponding to a state of charge of a sub power storage device newly connected to said second voltage converter after connection between said plurality of sub power storage devices and said second voltage converter is switched in said switching step.

8. The method for controlling a power supply system of an electrically powered vehicle according to claim 7, further comprising the step of performing a correction process for correcting a value of a parameter associated with said selected sub power storage device during a period in which connection between said plurality of sub power storage devices and said second voltage converter is switched, and as a result of said correction process, said value of said parameter is continuously varied from a first value associated with a sub power storage device disconnected from said second voltage converter to a second value associated with said newly connected sub power storage device.

9. The method for controlling a power supply system of an electrically powered vehicle according to claim 8, wherein said electrically powered vehicle includes a traveling control unit configured to control said second voltage converter by using a value of an input voltage for said second voltage converter while said electrically powered vehicle is traveling, said parameter includes a voltage of said selected sub power storage device, said power supply system further includes a capacitor for smoothing said input voltage for said second voltage converter and a voltage detection unit for detecting said input voltage, said method further comprises the step of causing said capacitor to discharge prior to switching of said selected sub power storage device, and in said step of performing a correction process, said traveling control unit is provided with a voltage value of said selected sub power storage device calculated in said correction process as a value of said input voltage, instead of a value detected by said voltage detection unit after said capacitor discharged in said step of causing said capacitor to discharge.

10. The method for controlling a power supply system of an electrically powered vehicle according to claim 7, further comprising the step of maintaining said upper limit values on electric power input and output at 0 during a period in which connection between said plurality of sub power storage devices and said second voltage converter is switched.

11. The method for controlling a power supply system of an electrically powered vehicle according to claim 7, further comprising the step of temporarily relaxing charging and discharging restriction on said main power storage device during a period from start of decrease in said upper limit values on electric power input and output in said decreasing step until completion of switching of connection between said plurality of sub power storage devices and said second voltage converter by said connection unit.

12. The method for controlling a power supply system of an electrically powered vehicle according to claim 7, wherein said electrically powered vehicle further includes an internal combustion engine configured to be able to output power to drive the vehicle independently of said motor, and said internal combustion engine is started when total required power of said electrically powered vehicle is greater than a sum of an upper limit value on electric power output from said main power storage device and an upper limit value on electric power output from said selected sub power storage device.

* * * * *